US012482393B2

(12) United States Patent
Sang et al.

(10) Patent No.: US 12,482,393 B2
(45) Date of Patent: Nov. 25, 2025

(54) DISPLAY DEVICE

(71) Applicant: LG DISPLAY CO., LTD., Seoul (KR)

(72) Inventors: Wookyu Sang, Paju-si (KR); Hyungsik Kim, Paju-si (KR); Moonsoo Chung, Paju-si (KR); Taehun Kim, Paju-si (KR)

(73) Assignee: LG Display Co., Ltd., Seoul (KR)

(*) Notice: Subject to any disclaimer, the term of this patent is extended or adjusted under 35 U.S.C. 154(b) by 48 days.

(21) Appl. No.: 18/224,372

(22) Filed: Jul. 20, 2023

(65) Prior Publication Data

US 2024/0038123 A1 Feb. 1, 2024

(30) Foreign Application Priority Data

Jul. 26, 2022 (KR) ........................ 10-2022-0092656

(51) Int. Cl.

| | |
|---|---|
| ***G09G 3/20*** | (2006.01) |
| ***G09G 3/3233*** | (2016.01) |
| ***G09G 3/3266*** | (2016.01) |

(52) U.S. Cl.

CPC ......... *G09G 3/2007* (2013.01); *G09G 3/3233* (2013.01); *G09G 3/3266* (2013.01); *G09G 2300/0819* (2013.01); *G09G 2300/0842* (2013.01); *G09G 2300/0861* (2013.01); *G09G 2310/0294* (2013.01); *G09G 2310/08* (2013.01);

(Continued)

(58) Field of Classification Search

CPC .. G09G 3/2007; G09G 3/3233; G09G 3/3266; G09G 2300/0819; G09G 2300/0842; G09G 2300/0861; G09G 2310/0294; G09G 2310/08; G09G 2320/0233; G09G 2320/0247; G09G 2330/021; G09G 2340/0435; G09G 2310/0251; G09G 2310/0262; G09G 2320/045; G09G 2360/16; G09G 3/3225; G09G 2310/0202; G09G 2310/0243; G09G 2310/0264; G09G 2310/027;

(Continued)

(56) References Cited

U.S. PATENT DOCUMENTS

2006/0041805 A1* 2/2006 Song .................... G09G 3/2011 714/724

2020/0226978 A1 7/2020 Lin et al.

(Continued)

FOREIGN PATENT DOCUMENTS

| | | | |
|---|---|---|---|
| KR | 10-2020-0087711 | A | 7/2020 |
| KR | 10-2021-0055146 | A | 5/2021 |
| KR | 10-2022-0022335 | A | 2/2022 |

*Primary Examiner* — Patrick N Edouard
*Assistant Examiner* — Joseph P Fox
(74) *Attorney, Agent, or Firm* — Morgan, Lewis & Bockius LLP

(57) ABSTRACT

Disclosed is a display device including: a display panel on which a plurality of pixels are arranged to display an image; a gate driver supplying scan signals and emission control signals to the display panel; and a controller driving the pixels by dividing the pixels into a refresh period and a hold period, and the plurality of pixels include an electroluminescent device and a pixel circuit for driving the electroluminescent device, and the pixel circuit includes a driving transistor having a first electrode configured to be applied with a data voltage and a bias voltage, and a second electrode connected to the electroluminescent device.

18 Claims, 13 Drawing Sheets

(52) U.S. Cl.
CPC ............... *G09G 2320/0233* (2013.01); *G09G 2320/0247* (2013.01); *G09G 2330/021* (2013.01); *G09G 2340/0435* (2013.01)

(58) Field of Classification Search
CPC ... G09G 2320/0271; G09G 2320/0626; G09G 2300/0809
See application file for complete search history.

(56) References Cited

U.S. PATENT DOCUMENTS

| | | | | |
|---|---|---|---|---|
| 2021/0327368 | A1* | 10/2021 | Park | G09G 3/3275 |
| 2022/0059030 | A1 | 2/2022 | Sang et al. | |
| 2022/0173189 | A1* | 6/2022 | Kim | G09G 3/325 |
| 2022/0319418 | A1* | 10/2022 | Yu | G09G 3/3233 |
| 2022/0335872 | A1* | 10/2022 | Zhang | G09G 3/20 |
| 2022/0358884 | A1* | 11/2022 | Chae | G09G 3/3233 |
| 2023/0317701 | A1* | 10/2023 | Kim | H01L 25/0753 257/79 |

* cited by examiner

DISPLAY DEVICE

The present application claims priority to Korea Patent Application No. 10-2022-0092656, filed on Jul. 26, 2022, the entire contents of which is incorporated herein for all purposes by this reference.

BACKGROUND

Technical Field

The present disclosure relates to a display device using a variable refresh rate (VRR) mode, which is intended to reduce occurrence of a difference in luminance at the time of grayscale change of an image during low-frequency driving in the VRR mode, thereby improving the occurrence of flicker during a scene change.

Discussion of the Related Art

A display device which uses an electroluminescent device such as an organic light emitting diode may be driven by various driving frequencies.

Recently, as one of various functions required for the display device, a variable refresh rate (VRR) is also required. The VRR is a technology that drives a display device at a constant frequency and activates pixels by increasing the refresh rate when high-speed driving is required, and drives pixels by reducing the refresh rate when it is necessary to reduce power consumption or low-speed driving is required.

Due to flicker that occurs when the grayscale of an image is changed during low-frequency driving in the VRR mode, a scene change may be perceived unnaturally by a viewer. Accordingly, it is required to prevent a viewer from recognizing flicker due to a scene change.

SUMMARY

Accordingly, embodiments of the present disclosure are directed to a display device that substantially obviates one or more of the problems due to limitations and disadvantages of the related art.

An aspect of the present disclosure is to provide a display device using a variable refresh rate (VRR) mode, which is intended to reduce occurrence of a difference in luminance at the time of grayscale change of an image, thereby improving the occurrence of flicker during a scene change.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display device comprises a display panel on which a plurality of pixels are arranged to display an image; and a controller driving the pixels by dividing the pixels into a refresh period and a hold period, and the plurality of pixels include an electroluminescent device and a pixel circuit for driving the electroluminescent device, and the pixel circuit includes a driving transistor having a first electrode configured to be applied with a data voltage and a bias voltage, and a second electrode connected to the electroluminescent device.

The technical problem to be achieved by the present disclosure is not limited to the above-mentioned technical problem, and other technical problems that are not mentioned will be clearly understood by ordinary-skilled persons in the art to which the present disclosure pertains from the following description.

The display device according to an embodiment of the present disclosure may reduce a deviation in luminance and thus, improve flicker, by resolving a deviation in the amount of bias stress of a driving transistor at the time of a scene change during which a grayscale of an image is changed by a first to fourth methods of luminance deviation compensation driving.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain various principles.

DETAILED DESCRIPTION

Figure 1:
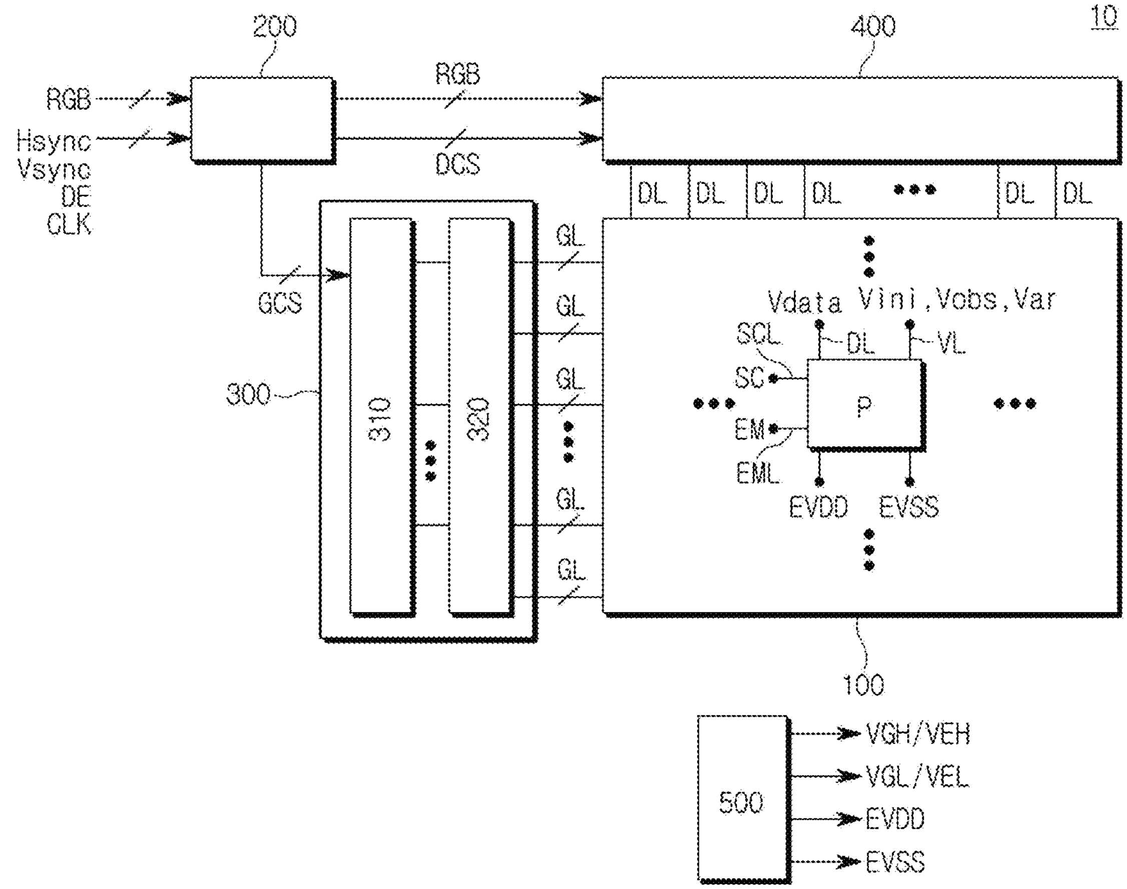
FIG. 1 is a block diagram schematically illustrating a display device according to an embodiment of the present disclosure.

The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. These embodiments are provided so that this disclosure will be thorough and complete, and will fully convey the scope of the present disclosure to those skilled in the art. The present disclosure will be defined only by the scope of the appended claims. Like reference numerals generally denote like elements throughout the specification.

It will be understood that when an element is referred to as being “connected” or “coupled” to another element, it may be directly connected or coupled to the other element or intervening elements may be present. In contrast, when an element is referred to as being “directly connected” or “directly coupled” to another element, there are no intervening elements present. As used herein, the term “and/or” includes any and all combinations of one or more of the associated listed items.

The terms used in the present specification are merely used to describe specific embodiments and are not intended to limit the present disclosure. A singular expression includes a plural expression unless a description to the contrary is specifically pointed out in context. The terms “comprises” and/or “comprising,” when used herein, specify the presence of stated elements, steps, operations, and/or components, but do not preclude the presence or addition of one or more other elements, steps, operations, and/or components.

Although the terms including an ordinal number such as first, second, etc. may be used for describing various elements, the structural elements are not restricted by the terms. The terms are only used to distinguish one element from another element.

Therefore, a first component to be mentioned below may be a second component in a technical concept of the present disclosure. Unless otherwise defined, all terms including technical and scientific terms used herein have the same meaning as commonly understood by one of ordinary skill in the art to which this invention belongs. It will be further understood that terms, such as those defined in commonly used dictionaries, will not be interpreted in an idealized or overly formal sense unless expressly so defined herein.

FIG. 1 is a block diagram schematically illustrating a display device according to an embodiment of the present disclosure.

Referring to FIG. 1, a display device 10 includes a display panel 100 including a plurality of pixels P, a controller 200, a gate driver 300 which supplies a gate signal to each of the plurality of pixels P, a data driver 400 which supplies a data signal to each of the plurality of pixels P, a power supply unit 500 which supplies power required to drive each of the plurality of pixels P.

The display panel 100 includes an active area AA where pixels P are located (refer to FIG. 2) and a non-active area NA disposed to surround the active area and in which the gate driver 300 and the data driver 400 are disposed. (refer to FIG. 2).

In the display panel 100, a plurality of gate lines GL and a plurality of data lines DL cross each other, and each of the plurality of pixels P is connected to the gate line GL, and the data line DL. Specifically, one pixel P receives the gate signal from the gate driver 300 through the gate line GL, receives the data signal from the data driver 400 through the data line DL, and receives a high-potential driving voltage EVDD and a low-potential driving voltage EVSS through the power supply unit 500.

Here, the gate line GL provides a scan signal SC and an emission control signal EM, and the data line DL supplies a data voltage Vdata. Also, according to various embodiments, the gate line GL may include a plurality of scan lines SCL supplying the scan signal SC and the emission control signal line EML supplying the emission control signal EM. Also, the plurality of pixels P may additionally include a power supply line VL to receive a bias voltage Vobs and initialization voltages Var and Vini.

Figure 2:
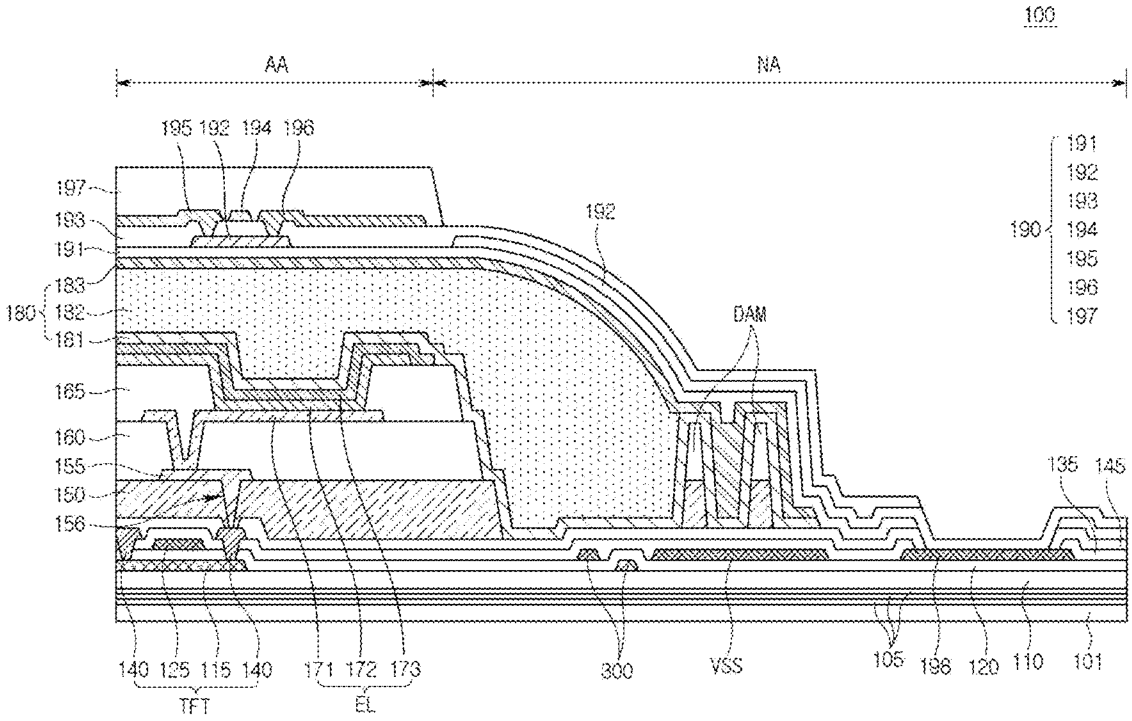
FIG. 2 is a cross-sectional view illustrating a laminated form of a display device according to an embodiment of the present disclosure.

Also, each of the pixels P includes an electroluminescent device EL and a pixel circuit that controls driving of the electroluminescent device EL, as illustrated in FIG. 2. Here, the electroluminescent device EL consists of an anode electrode 171, a cathode electrode 173, and an emission layer 172 between the anode electrode 171 and the cathode electrode 173.

The pixel circuit includes a plurality of switching elements, a driving element, and a capacitor. Here, the switching element and the driving element may be configured by a thin film transistor. In the pixel circuit, the driving element controls a current amount supplied to the electroluminescent device EL in accordance with a data voltage to adjust an emission amount of the electroluminescent device EL. Further, the plurality of switching elements receive the scan signal SC supplied by means of a plurality of scan lines SCL and the emission control signal EM supplied by means of the emission control signal line EML to operate the pixel circuit.

The display panel 100 may be implemented as a non-transmissive display panel or a transmissive display panel. The transmissive display panel is applicable to a transparent display device in which an image is displayed on a screen and a real background object is visible. The display panel may be manufactured as a flexible display panel. The flexible display panel may be implemented as an organic light-emitting diode (OLED) panel using a plastic substrate.

Each of pixels P may be divided into a red sub-pixel, a green sub-pixel, and a blue sub-pixel for color implementation. Each of the pixels P may further include a white sub-pixel. Each of the pixels P includes a pixel circuit.

Touch sensors may be arranged on the display panel 100. A touch input may be sensed using separate touch sensors or through the pixels P. The touch sensors may be implemented as on-cell type or add-on type touch sensors, which are arranged on a screen of the display panel, or may be implemented as in-cell type touch sensors, which are embedded in the display panel 100.

The controller 200 processes properly image data RGB input from the outside according to the size and the resolution of the display panel 100 and supplies the image data RGB to the data driver 400. The controller 200 generates gate control signals GCS and data control signals DCS by using synchronizing signals input from the outside, for example, a dot clock signal CLK, a data enable signal DE, a horizontal synchronizing signal Hsync, and a vertical synchronizing signal Vsync. The controller 200 controls the gate driver 300 and the data driver 400 by supplying the generated gate control signal GCS and the data control signal DCS to the gate driver 300 and the data driver 400, respectively.

The controller 200 may be coupled to various processors, for example, a microprocessor, a mobile processor, an application processor, etc., according to a mounted device.

A host system may be one of a television system, a set-top box, a navigation system, a personal computer (PC), a home theater system, a mobile device, a wearable device, and a vehicle system.

The controller 200 may multiply an input frame frequency by i (here, i is an integer greater than zero) to control the operation timing of a display panel driving unit at a frame frequency of the input frame frequency xi Hz. The input frame frequency is 60 Hz for National Television Standards Committee (NTSC) and 50 Hz for Phase-Alternating Line (PAL).

The controller 200 generates a signal such that the pixel can be driven at various refresh rates. That is, the controller 200 generates signals related to driving such that the pixels P are driven in a variable refresh rate (VRR) mode or driven to be switchable between a first refresh rate and a second refresh rate. For example, the controller 200 simply changes the speed of a clock signal, generates a synchronization signal to generate a horizontal blank or a vertical blank, or drives the gate driver 300 in a mask method, thereby driving the pixel P at various refresh rates.

The controller 200 generates a gate control signal GCS for controlling operation timing of the gate driver 300 and a data control signal DSC for controlling operation timing of the data driver 400 based on the timing signal (Vsync, Hsync, DE) received from the host system. The controller 200 controls the operation timing of the display panel driving unit to synchronize the gate driver 300 and the data driver 400.

A voltage level of the gate timing control signal output from the controller 200 may be converted to gate-off voltages VGH and VEH and gate-on voltages VGL and VEL through a level shifter that is omitted in the drawing, and may be supplied to the gate driver 300. The level shifter may convert a low level voltage of the gate control signal into the gate-low voltage VGL, and convert a high level voltage of the gate control signal into the gate-high voltage VGH. The gate control signal GCS includes a start pulse and a shift clock.

The gate driver 300 provides scan signals SC to gate lines GL in accordance with the gate control signal GCS provided from the controller 200. The gate driver 300 may be disposed on one side or both sides of the display panel 100 in a Gate In Panel (GIP) method.

The gate driver 300 sequentially outputs gate signals to the plurality of gate lines GL under control of the controller 200. The gate driver 300 may sequentially supply the gate signals to the gate lines GL by shifting the gate signals using a shift register.

The gate signal may include the scan signal SC and the emission control signal EM in the organic light emitting display device. The scan signal SC includes a scan pulse swinging between the gate-on voltage VGL and the gate-off voltage VGH. The emission control signal EM may include an emission control signal pulse swinging between the gate-on voltage VEL and the gate-off voltage VEH.

The scan pulse is synchronized to the data voltage Vdata to select the pixels P of the line to which data is to be written. The emission control signal EM defines an emission time of the pixels P.

The gate driver 300 may include an emission driver 310 and at least one or more scan drivers 320.

The emission driver 310 outputs emission control signal pulses in response to the start pulse and shift clock from the controller 200 and sequentially shifts the emission control signal pulses according to the shift clock.

The at least one or more scan drivers 320 output scan pulses in response to the start pulse and the shift clock from the controller 200 and shift the scan pulse according to a shift clock timing.

The data driver 400 converts the image data RGB into the data voltage Vdata according to the data control signal DCS supplied from the controller 200 and supplies the converted data voltage Vdata to the pixel P through the data line DL.

Although the data driver 400 is illustrated in FIG. 1 as being disposed on one side of the display panel 100 in a single shape, the number and position of the data driver 400 is not limited thereto.

That is, the data driver 400 may consist of a plurality of integrated circuits (ICs) and may be divided into a plurality of and disposed on one side of the display panel 100.

The power supply unit 500 generates DC power necessary for driving a pixel array of the display panel 100 and the display panel driving unit by using a DC-DC converter. The DC-DC converter may include a charge pump, a regulator, a buck converter, a boost converter, and the like. The power supply unit 500 may receive a DC input voltage applied from the host system (not illustrated) and generate gate-on voltages VGL and VEL, DC voltages such as gate-off voltages VGH and VEH, the high-potential driving voltage EVDD, the low-potential driving voltage EVSS, and the like. The gate-on voltages VGL and VEL and gate-off voltages VGH and VEH are supplied to the level shifter (not illustrated) and the gate driver 300. The high-potential driving voltage EVDD and the low-potential driving voltage EVSS are commonly supplied to the pixels P.

FIG. 2 is a cross-sectional view illustrating a laminated form of the display device according to an embodiment of the present disclosure.

Referring to FIG. 2, a thin film transistor TFT for driving the electroluminescent device EL may be disposed in the active area AA on a substrate 101. The thin film transistor TFT may include a semiconductor layer 115, a gate electrode 125, and a source electrode and a drain electrode 140. The thin film transistor TFT is the driving transistor DT (refer to FIG. 4). For the convenience of description, among various thin film transistors that can be included in the display device 10, only the driving transistor DT is illustrated, however, other thin film transistors such as a switching transistor may also be included in the display device 10. Further, in the present disclosure, even though it is described that the thin film transistor TFT has a coplanar structure, the thin film transistor may be implemented to have another structure such as a staggered structure and is not limited thereto.

The driving transistor DT may control a current which is supplied from the high-potential driving voltage EVDD to the electroluminescent device EL in response to a data signal supplied to the gate electrode 125 of the driving transistor DT. Therefore, the driving transistor DT may adjust an emission amount of the electroluminescent device EL and supply a constant current by a voltage charged in a storage capacitor (not illustrated) until a data signal of the next frame is supplied to allow the electroluminescent device EL to maintain emission. The high-potential supply line may be formed to be parallel to the data line DL.

As illustrated in FIG. 2, the thin film transistor TFT may include the semiconductor layer 115 disposed on a first insulating layer 110, the gate electrode 125 overlapping the semiconductor layer 115 with a second insulating layer 120 therebetween, and the source electrode and the drain electrode 140 which are formed on a third insulating layer 135 to be in contact with the semiconductor layer 115.

When the thin film transistor TFT is driven, a channel is formed in the semiconductor layer 115. The semiconductor layer 115 may be formed of an oxide semiconductor or various organic semiconductors such as amorphous silicon (a-Si), polycrystalline silicon (poly-Si), or pentacene, but is not limited thereto. The semiconductor layer 115 may be formed on the first insulating layer 110. The semiconductor layer 115 may include a channel region, a source region, and a drain region. The channel region overlaps the gate electrode 125 with the first insulating layer 110 therebetween to form a channel region between the source electrode and the drain electrode 140. The source region is electrically connected to the source electrode 140 through a contact hole which passes through the second insulating layer 120 and the third insulating layer 135. The drain region is electrically connected to the drain electrode 140 through a contact hole which passes through the second insulating layer 120 and the third insulating layer 135. A buffer layer 105 and the first insulating layer 110 may be disposed between the semiconductor layer 115 and the substrate 101. The buffer layer 105 delays the diffusion of moisture and/or oxygen which permeates the substrate 110. The first insulating layer 110 protects the semiconductor layer 115 and blocks various types of defects introduced from the substrate 101.

A top layer of the buffer layer 105 which is in contact with the first insulating layer 110 may be formed of a material having a different etching property from the remaining layers of the buffer layer 105, the first insulating layer 110, the second insulating layer 120, and the third insulating layer 135. The top layer of the buffer layer 105 which is in contact with the first insulating layer 110 may be formed of any one of silicon nitride SiNx and silicon oxide SiOx. The remaining layers of the buffer layer 105, the first insulating layer 110, the second insulating layer 120, and the third insulating layer 135 may be formed of the other one of silicon nitride SiNx and silicon oxide SiOx. For example, the top layer of the buffer layer 105 which is in contact with the first insulating layer 110 may be formed of silicon nitride SiNx and the remaining layers of the buffer layer 105, the first insulating layer 110, the second insulating layer 120, and the third insulating layer 135 may be formed of silicon oxide SiOx, but are not limited thereto.

The gate electrode 125 is formed on the second insulating layer 120 and overlaps the channel region of the semiconductor layer 115 with the second insulating layer 120 therebetween. The gate electrode 125 may be formed of a single layer or a multi-layered first conductive material formed of any one of magnesium (Mg), molybdenum (Mo), aluminum (Al), chrome (Cr), gold (Au), titanium (Ti), nickel (Ni), neodymium (Nd), and copper (Cu), or an alloy thereof, but is not limited thereto.

The source electrode 140 may be connected to the source region of the semiconductor layer 115 which is exposed through a contact hole which passes through the second insulating layer 120 and the third insulating layer 135. The drain electrode 140 is opposite to the source electrode 140 and may be connected to the drain region of the semiconductor layer 115 which is exposed through a contact hole which passes through the second insulating layer 120 and the third insulating layer 135. The source electrode and the drain electrode 140 may be formed of a single layer or a multi-layered second conductive material formed of any one of molybdenum (Mo), aluminum (Al), chrome (Cr), gold (Au), titanium (Ti), nickel (Ni), neodymium (Nd), and copper (Cu), or an alloy of one or two or more thereof, but is not limited thereto.

A connection electrode 155 may be disposed between a first intermediate layer 150 and a second intermediate layer 160. The connection electrode 155 is exposed through a connection electrode contact hole 156 which passes through a protective layer 145 and the first intermediate layer 150 to be connected to the drain electrode 140. The connection electrode 155 may be formed of a material having a low specific resistance, which is the same as or similar to the drain electrode 140, but is not limited thereto.

Referring to FIG. 2, the electroluminescent device EL including a light emitting layer 172 may be disposed on the second intermediate layer 160 and a bank layer 165. The electroluminescent device EL may include the anode electrode 171, at least one light emitting layer 172 formed on the anode electrode 171, and the cathode electrode 173 formed on the light emitting layer 172.

The anode electrode 171 may be electrically connected to the connection electrode 155 which is disposed on the first intermediate layer 150 through a contact hole which passes through the second intermediate layer 160 and is exposed in an upper portion of the second intermediate layer 160.

The anode electrode 171 of each pixel is formed to be exposed by the bank layer 165. The bank layer 165 may be formed of an opaque material (for example, black) to suppress the light interference between adjacent pixels. In this case, the bank layer 165 may include a light shielding material which is formed of at least any one of a color pigment, organic black, and carbon, but is not limited thereto.

Referring to FIG. 2, at least one light emitting layer 172 may be formed on the anode electrode 171 in an emission region provided by the bank layer 165. At least one light emitting layer 172 includes a hole transport layer, a hole injection layer, a hole blocking layer, the light emitting layer 172, an electron injection layer, an electron blocking layer, and an electron transport layer on the anode electrode 171 and the layers may be laminated in this order or a reverse order in accordance with an emission direction. Further, the light emitting layer 172 may include first and second emission stacks which are opposite to each other with a charge generating layer therebetween. In this case, the light emitting layer 172 of any one of the first and second emission stacks generates blue light and the light emitting layer 172 of the other one of the first and second emission stacks generates yellow-green light so that white light may be generated by the first and the second emission stacks. The white light generated in the emission stack is incident onto a color filter located above or below the light emitting layer 172 to implement color images. As another example, each of the light emitting layers 172 may generate color light corresponding to individual pixels without having separate color filters to implement color images. For example, the light emitting layer 172 of a red pixel may generate red light, the light emitting layer 172 of a green pixel may generate green light, and the light emitting layer 172 of a blue pixel may generate blue light.

Referring to FIG. 2, the cathode electrode 173 is formed to be opposite to the anode electrode 171 with the light emitting layer 172 therebetween and is supplied with the high-potential driving voltage EVDD.

An encapsulating layer 180 blocks moisture or oxygen from being permeated into the electroluminescent device EL which is vulnerable to the moisture or oxygen from the outside. To this end, the encapsulating layer 180 may include at least one inorganic encapsulating layer and at least one organic encapsulating layer, but is not limited thereto. In the present disclosure, a structure of the encapsulating layer 180 in which a first encapsulating layer 181, a second encapsulating layer 182, and a third encapsulating layer 183 are sequentially laminated will be described as an example.

The first encapsulating layer 181 is formed on the substrate 101 on which the cathode electrode 173 is formed. The third encapsulating layer 183 is formed on the substrate 101 on which the second encapsulating layer 182 is formed and encloses a top surface, a bottom surface, and a side surface of the second encapsulating layer 182 together with the first encapsulating layer 181. The first encapsulating layer 181 and the third encapsulating layer 183 may minimize or suppress the permeation of external moisture or oxygen into the electroluminescent device EL. The first encapsulating layer 181 and the third encapsulating layer 183 are formed of an inorganic insulating material on which low-temperature deposition is allowed, such as silicon nitride SiNx, silicon oxide SiOx, silicon oxynitride SiON, or aluminum oxide $Al_2O_3$. The first encapsulating layer 181 and the third encapsulating layer 183 are deposited under a low temperature atmosphere so that the damage of the electroluminescent device EL which is vulnerable to a high temperature atmosphere may be suppressed during the deposition process of the first encapsulating layer 181 and the third encapsulating layer 183.

The second encapsulating layer 182 serves as a buffer which alleviates stress between layers due to the bending of the display device 10 and planarizes the step between layers. The second encapsulating layer 182 may be formed of acryl resin, epoxy resin, phenolic resin, polyamide resin, polyimide resin, and polyethylene or a nonphotosensitive organic insulating material such as silicon oxy carbon (SiOC), or a photosensitive organic insulating material such as photoacryl, on the substrate 101 on which the first encapsulating layer 181 is formed, but is not limited thereto. When the second encapsulating layer 182 is formed using an inkjet method, a dam DAM may be disposed to suppress a liquefied second encapsulating layer 182 from being diffused to an edge of the substrate 101. The dam DAM may be disposed to be closer to the edge of the substrate 101 than the second encapsulating layer 182. The dam DAM may suppress the second encapsulating layer 182 from being diffused into a pad region where a conductive pad disposed at an outermost periphery of the substrate 101 is disposed.

The dam DAM is designed to suppress the diffusion of the second encapsulating layer 182. However, when the second encapsulating layer 182 is formed to exceed a height of the dam DAM during the process, the second encapsulating layer 182 which is an organic layer may be exposed to the outside so that moisture may be easily permeated into the electroluminescent device. Therefore, in order to avoid the above-mentioned problem, at least ten or more dams DAM may be repeatedly formed.

Referring to FIG. 2, the dam DAM may be disposed on the protective layer 145 of the non-active area NA.

Further, the dam DAM may be simultaneously formed with the first intermediate layer 150 and the second intermediate layer 160. When the first intermediate layer 150 is formed, a lower layer of the dam DAM is formed together and when the second intermediate layer 160 is formed, an upper layer of the dam DAM is formed together so that the dam DAM may be laminated to have a double-layered structure.

Therefore, the dam DAM may be configured with the same material as the first intermediate layer 150 and the second intermediate layer 160, but is not limited thereto.

Referring to FIG. 2, the dam DAM may be formed to overlap a low-voltage power supply line VSS. For example, on a lower layer of a region of the non-active area NA where the dam DAM is located, the low-voltage power supply line VSS may be formed.

The low-voltage power supply line VSS and the gate driver 300 formed in the Gate In Panel (GIP) method are formed to enclose the outer periphery of the display panel and the low-voltage power supply line VSS may be located at the outer periphery more than the gate driver 300. Further, the low-voltage power supply line VSS is connected to the anode electrode 171 to apply a common voltage. Even though the gate driver 300 is simply illustrated in a plan view and a cross-sectional view, the gate driver 300 may be configured using a thin film transistor TFT having the same structure as the thin film transistor TFT of the active area AA.

Referring to FIG. 2, the low-voltage power supply line VSS is disposed at the outside more than the gate driver 300. The low-voltage power supply line VSS is disposed at the outside more than the gate driver 300 and encloses the active area AA. The low-voltage power supply line VSS may be formed of the same material as the source electrode and the drain electrode 140 of the thin film transistor TFT, but is not limited thereto. For example, the low-voltage power supply line VSS may be formed of the same material as the gate electrode 125.

Further, the low-voltage power supply line VSS may be electrically connected to the anode electrode 171. The low-voltage power supply line VSS may supply a low-potential driving voltage EVSS to the plurality of pixels of the active area AA.

A touch layer 190 may be disposed on the encapsulating layer 180. In the touch layer 190, the touch buffer layer 191 may be positioned between the touch sensor metal including touch electrode connection lines 192 and 194 and touch electrodes 195 and 196 and the cathode electrode 173 of the electroluminescent device EL.

Further, the touch buffer layer 191 may suppress the permeation of a chemical solution (a developer, an etchant, or the like) used for a manufacturing process of a touch sensor metal disposed on the touch buffer layer 191, moisture from the outside, or the like, into the emission layer 172 including an organic material. Accordingly, the touch buffer layer 191 may suppress the damage of the emission layer 172 which is vulnerable to the chemical solution or the moisture.

The touch buffer layer 191 may be formed of an organic insulating material which is formed at a low temperature of a predetermined temperature (for example, 100° C.) or lower to suppress the damage of the emission layer 172 including an organic material which is vulnerable to a high temperature. The organic insulating material has a low permittivity of 1 to 3. For example, the touch buffer layer 191 may be formed of acrylic-, epoxy-, or siloxane-based material. The touch buffer layer 191 which is formed of an organic insulating material and has a planarization performance may suppress the damage of the encapsulating layers 180 in accordance with the bending of the organic light emitting display device. Further, the touch buffer layer 191 may suppress the crack of the touch sensor metal formed on the touch buffer layer 191.

According to a mutual-capacitance-based touch sensor structure, touch electrodes 195 and 196 are disposed on the touch buffer layer 191 and the touch electrodes 195 and 196 are disposed to intersect each other.

The touch electrode connection lines 192 and 194 may electrically connect between the touch electrodes 195 and 196. The touch electrode connection lines 192 and 194 and the touch electrodes 195 and 196 may be disposed on different layers with a touch insulating layer 193 therebetween.

The touch electrode connection lines 192 and 194 may be disposed so as to overlap a bank 165. Accordingly, the degradation of an aperture rate may be suppressed by the touch electrode connection lines 192 and 194.

In the meantime, the touch electrodes 195 and 196 may be electrically connected to a touch driving circuit (not illustrated) through a touch pad 198, as part of the touch electrode connection line 192 passes over a top and side of the dam DAM.

The part of the touch electrode connection line 192 may receive a touch driving signal from the touch driving circuit, and may transmit the same to the touch electrodes 195 and 196, or may transmit a touch sensing signal from the touch electrodes 195 and 196 to the touch driving circuit.

A touch protection layer 197 may be arranged on the touch electrodes 195 and 196. In the drawing, the touch protection layer 197 is illustrated as being arranged only on the touch electrodes 195 and 196, but is not limited thereto, and may be extended to the front or back of the dam DAM so as to be arranged on the touch electrode connection line 192.

In addition, a color filter (not illustrated) may be further disposed on the encapsulating layer 180 and the color filter may be located on the touch layer 190 or located between the encapsulating layer 180 and the touch layer 190.

Figure 3:
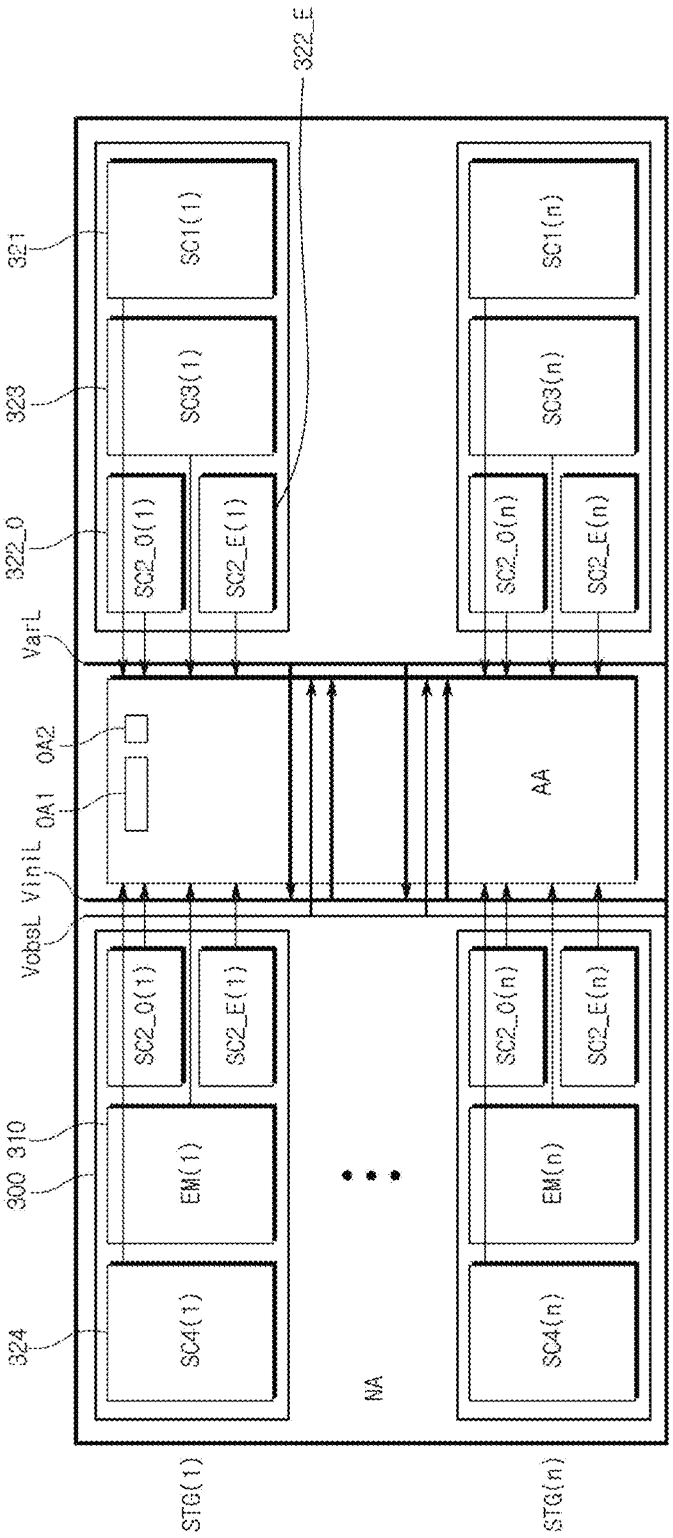
FIG. 3 is a view of a configuration of a gate driver in a display device according to an embodiment of the present disclosure.

FIG. 3 is a view of a configuration of the gate driver in the display device according to the embodiment of the present disclosure.

Referring to FIG. 3, the gate driver 300 includes the emission driver 310 and a scan driver 320. The scan driver 320 may consist of a first to fourth scan drivers 321, 322, 323, and 324. In addition, the second scan driver 322 may consist of an odd-numbered second scan driver 322_O and an even-numbered second scan driver 322_E.

In the gate driver 300, shift registers may be configured symmetrically on both sides of the active area AA. In addition, the gate driver 300 may be configured such that the shift register thereof on one side of the active area AA includes the second scan drivers 322_O and 322_E, the fourth scan driver 324, and the emission driver 310, and the shift register thereof on the other side of the active area AA includes the first scan driver 321, the second scan drivers 322_O and 322_E, and the third scan driver 323, respectively. However, the present disclosure is not limited thereto, and the emission driver 310 and the first to fourth scan drivers 321, 322, 323, and 324 may be differently arranged according to embodiments.

Each of the stages STG1 to STGn of the shift register includes first scan signal generators SC1(1) to SC1(*n*), second scan signal generators SC2_O(1) to SC2_O(*n*), and SC2_E(1) to SC2_E(n), third scan signal generators SC3(1) to SC3(*n*), fourth scan signal generators SC4(1) to SC4(*n*), and emission control signal generators EM(1) to EM(n), respectively.

The first scan signal generators SC1(1) to SC1(*n*) output first scan signals SC1(1) to SC1(*n*) through the first scan lines SCL1 of the display panel 100. The second scan signal generators SC2(1) to SC2(*n*) output second scan signals SC2(1) to SC2(*n*) through the second scan lines SCL2 of the display panel 100. The third scan signal generators SC3(1) to SC3(*n*) output third scan signals SC3(1) to SC3(*n*) through the third scan lines SCL3 of the display panel 100. The fourth scan signal generators SC4(1) to SC4(*n*) output fourth scan signals SC4(1) to SC4(*n*) through the fourth scan lines SCL4 of the display panel 100. The emission control signal generators EM(1) to EM(n) output the emission control signals EM(1) to EM(n) through the emission control lines EML of the display panel 100.

The first scan signals SC1(1) to SC1(*n*) may be used as signals for driving an A-th transistor (e.g., a compensation transistor, and the like) included in the pixel circuit. The second scan signals SC2(1) to SC2(*n*) may be used as signals for driving a B-th transistor (e.g., a data supply transistor, and the like) included in the pixel circuit. The third scan signals SC3(1) to SC3(*n*) may be used as signals for driving a C-th transistor (e.g., bias transistor, and the like) included in the pixel circuit. The fourth scan signals SC4(1) to SC4(*n*) may be used as signals for driving a D-th transistor (e.g., an initialization transistor, and the like) included in the pixel circuit. The emission control signals EM(1) to EM(n) may be used as signals for driving an E-th transistor (e.g., an emission control transistor, and the like) included in the pixel circuit. For example, when light emitting control transistors of the pixels are controlled using the emission control signals EM(1) to EM(n), the emission time of the electroluminescent device is varied.

Referring to FIG. 3, a bias voltage bus line VobsL, a first initialization voltage bus line VarL, and a second initialization voltage bus line ViniL may be disposed between the gate driver 300 and the active area AA.

The bias voltage bus line VobsL, the first initialization voltage bus line VarL, and the second initialization voltage bus line ViniL may, respectively, supply the bias voltage Vobs, a first initialization voltage Var, and the second initialization voltage Vini from the power supply unit 500 to the pixel circuit.

In the drawing, the bias voltage bus line VobsL, the first initialization voltage bus line VarL, and the second initialization voltage bus line ViniL are illustrated as being positioned on only one side of the left or right side of the active area AA, respectively, but are not limited thereto, and may be positioned on both sides, and in addition, even if they are located on one side, a position on the left or right side is not limited.

Referring to FIG. 3, one or more optical areas OA1 and OA2 may be disposed in the active area AA.

One or more optical areas OA1 and OA2 may be disposed to overlap one or more optical electronic devices, such as a photographing device such as a camera (image sensor) and a detection sensor such as a proximity sensor and an illuminance sensor.

The one or more optical areas OA1 and OA2 may have a transmittance of a certain level or higher by forming a light transmission structure for the operation of the optical electronic device. In other words, the number of pixels P per unit area in the one or more optical areas OA1 and OA2 may be smaller than the number of pixels P per unit area in a general area excluding the optical areas OA1 and OA2 in the active area AA. That is, a resolution of one or more optical areas OA1 and OA2 may be lower than that of the general area in the active area AA.

A light transmission structure in one or more optical areas OA1 and OA2 may be formed by patterning the cathode electrode in a portion where the pixel P is not disposed. At this time, the cathode electrode to be patterned may be removed using a laser, or the cathode electrode may be selectively formed and patterned using a material such as a cathode deposition prevention layer.

In addition, the light transmission structure in the one or more optical areas OA1 and OA2 may be configured by forming the electroluminescent device EL and the pixel circuit separately in the pixel P. In other words, the electroluminescent device EL of the pixel P is located in the optical areas OA1 and OA2, and the plurality of transistors TFT constituting the pixel circuit are disposed around the optical areas OA1 and OA2, thereby the electroluminescent device EL and the pixel circuit may be electrically connected through a transparent metal layer.

Figure 4:
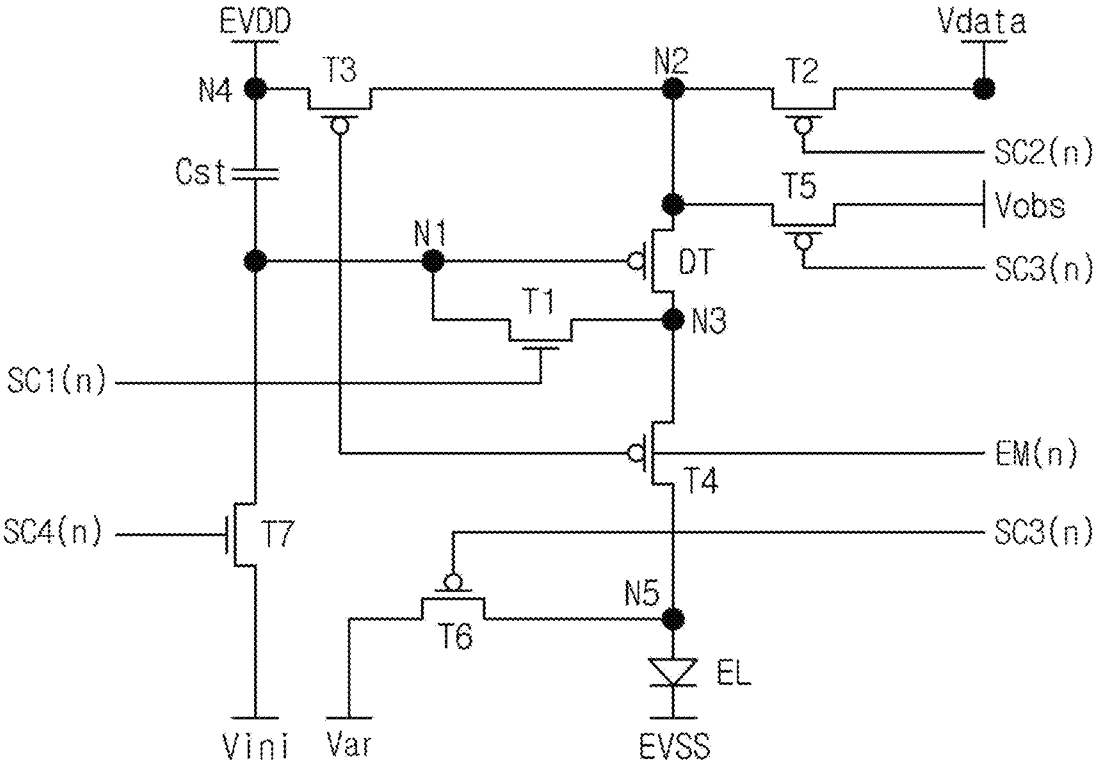
FIG. 4 is a view of a pixel circuit in a display device according to an embodiment of the present disclosure.

FIG. 4 is a view of a pixel circuit in the display device according to the embodiment of the present disclosure.

FIG. 4 only shows a pixel circuit as an example for description, and any structure capable of controlling light emission of the electroluminescent device EL by applying the emission control signal EM(n) is allowed. For example, the pixel circuit may include an additional scan signal, a switching thin film transistor connected thereto, and a switching thin film transistor to which an additional initialization voltage is applied, and the connection relationship of the switching elements or the connection position of the capacitor may be variously arranged. Hereinafter, for convenience of description, the display device having the pixel circuit structure of FIG. 4 will be described.

Referring to FIG. 4, each of the plurality of pixels P may include the pixel circuit having the driving transistor DT and the electroluminescent device EL connected to the pixel circuit.

The pixel circuit may drive the electroluminescent device EL by controlling a driving current flowing through the electroluminescent device EL. The pixel circuit may include the driving transistor DT and first to seventh transistors T1 to T7, and the capacitor Cst. Each of the transistors DT and T1 to T7 may include the first electrode, the second electrode, and the gate electrode. One of the first electrode and the second electrode may be the source electrode, and the other of the first electrode and the second electrode may be the drain electrode.

Each of the transistors DT and T1 to T7 may be a P type thin film transistor or an N type thin film transistor. In the embodiment of FIG. 3, the first transistor T1 and the seventh transistor T7 are configured as the N type thin film transistors, and the remaining transistors DT and T2 to T6 are configured as the P type thin film transistors. However, the configuration is not limited thereto, and all or some of the transistors DT and T1 to T7 may be the P type thin film transistors or N type thin film transistors according to embodiments. Also, the N type thin film transistor may be an oxide thin film transistor, and the P type thin film transistor may be a polysilicon thin film transistor.

Hereinafter, a case where the first transistor T1 and the seventh transistor T7 are the N type transistors and the other transistors DT and T2 to T6 are the P type transistors will be described as an example. Therefore, the first transistor T1 and the seventh transistor T7 are turned on by applying a high voltage, and the remaining transistors DT and T2 to T6 are turned on by applying a low voltage.

According to an example, the first transistor T1 constituting the pixel circuit may function as a compensation transistor, the second transistor T2 may function as a data supply transistor, the third and fourth transistors T3 and T4 may function as emission control transistors, the fifth transistor T5 may function as a bias transistor, and the sixth and seventh transistors T6 and T7 may function as initialization transistors.

The electroluminescent device EL may include the anode electrode (or anode electrode) and the cathode electrode. The anode electrode of the electroluminescent device EL may be connected to a fifth node N5, and the cathode electrode may be connected to the low-potential driving voltage EVS S.

The driving transistor DT may include the first electrode connected to a second node N2, the second electrode connected to a third node N3, and the gate electrode connected to a first node N1. The driving transistor DT may provide the driving current Id to the electroluminescent device EL based on the voltage of the first node N1 (or the data voltage stored in the capacitor Cst to be described later).

The first transistor T1 may include the first electrode connected to the first node N1, the second electrode connected to the third node N3, and the gate electrode which receives the first scan signal SC1(*n*). The first transistor T1 may be turned on in response to the first scan signal SC1(*n*) and may transmit the data voltage Vdata to the first node N1. The first transistor T1 is diode-connected between the first node N1 and the third node N3, thereby sampling a threshold voltage Vth of the driving transistor DT. The first transistor T1 may be a compensation transistor.

The capacitor Cst may be connected or formed between the first node N1 and a fourth node N4. The capacitor Cst may store or maintain the provided high-potential driving voltage EVDD.

The second transistor T2 may include the first electrode connected to the data line DL (or receiving the data voltage Vdata), the second electrode connected to the second node N2, and the gate electrode which receives the second scan signal SC2(*n*). The second transistor T2 may be turned on in response to the second scan signal SC2(*n*) and may transmit the data voltage Vdata to the second node N2. The second transistor T2 may be a data supply transistor.

The third transistor T3 and the fourth transistor T4 (or the first and second emission control transistors) may be connected between the high-potential driving voltage EVDD and the electroluminescent device EL, and may form a current moving path through which the driving current Id which is generated by the driving transistor DT moves.

The third transistor T3 may include the first electrode which is connected to the fourth node N4 and receives the high-potential driving voltage EVDD, the second electrode which is connected to the second node N2, and the gate electrode which receives the emission control signal EM(n).

The fourth transistor T4 may include the first electrode which is connected to the third node N3, the second electrode which is connected to the fifth node N5 (or the anode electrode of the electroluminescent device EL), and the gate electrode which receives the emission control signal EM(n).

The third and fourth transistors T3 and T4 are turned on in response to the emission control signal EM(n). In this case, the driving current Id is supplied to the electroluminescent device EL, and the electroluminescent device EL can emit light with a luminance corresponding to the driving current Id.

The fifth transistor T5 includes the first electrode which receives the bias voltage Vobs, the second electrode which is connected to the second node N2, and the gate electrode which receives the third scan signal SC3(*n*). The fifth transistor T5 may be the bias transistor.

The sixth transistor T6 may include the first electrode which receives the first initialization voltage Var, the second electrode which is connected to the fifth node N5, and the gate electrode which receives the third scan signal SC3(*n*).

Before the electroluminescent device EL emits light (or after the electroluminescent device EL emits light), the sixth transistor T6 may be turned on in response to the third scan signal SC3(*n*) and may initialize the anode electrode (or pixel electrode) of the electroluminescent device EL by using the first initialization voltage Var. The electroluminescent device EL may have a parasitic capacitor formed between the anode electrode and the cathode electrode. Also, while the electroluminescent device EL emits light, the parasitic capacitor is charged so that the anode electrode of the electroluminescent device ELD may have a specific voltage. Accordingly, by applying the first initialization voltage Var to the anode electrode of the electroluminescent device ELD through the sixth transistor T6, the amount of charge accumulated in the electroluminescent device ELD can be initialized.

In the present disclosure, the gate electrodes of the fifth and sixth transistors T5 and T6 are configured to receive the third scan signal SC3(*n*) in common. However, the present disclosure is not necessarily limited thereto, and the gate electrodes of the fifth and sixth transistors T5 and T6 may be configured to receive separate scan signals and to be controlled independently, respectively.

The seventh transistor T7 may include the first electrode which receives the second initialization voltage *Vini*, the second electrode which is connected to the first node N1, and the gate electrode which receives the fourth scan signal SC4(*n*).

The seventh transistor T7 may be turned on in response to the fourth scan signal SC4(*n*) and may initialize the gate electrode of the driving transistor DT by using the second initialization voltage *Vini*. Unnecessary charges may remain on the gate electrode of the driving transistor DT due to the high-potential driving voltage EVDD stored in the capacitor Cst. Accordingly, by applying the second initialization voltage *Vini* to the gate electrode of the driving transistor DT through the seventh transistor T7, the amount of charge remained can be initialized.

FIGS. Sato 5*c* are views explaining operations of the scan signal and the emission control signal in a refresh period and a hold period in the pixel circuit illustrated in FIG. 4.

The another display device according to the embodiment of the present disclosure may operate by using a variable refresh rate (VRR) mode. The VRR is a technology that drives the display device at a constant frequency and activates pixels by increasing the refresh rate at which the data voltage Vdata is updated when high-speed driving is required, and drives pixels by reducing the refresh rate when it is necessary to reduce power consumption or low-speed driving is required.

Each of the plurality of pixels P may be driven through a combination of a refresh frame and a hold frame within one second. In this specification, one set is defined as that the combination of the refresh frame in which the data voltage Vdata is updated and the hold frame in which the data voltage Vdata is not updated within one second is repeated. Also, one set period is a cycle in which the combination of the refresh frame and the hold frame is repeated.

When the display device is driven at the refresh rate of 120 Hz, the display device can be driven only by the refresh period. That is, the refresh period can be driven 120 times within one second. One refresh period is 1/120=8.33 ms, and one set period is also 8.33 ms.

When the display device is driven at the refresh rate of 60 Hz, the refresh period and the hold period may be alternately driven. That is, the refresh period and the hold period may be alternately driven 60 times within one second. One refresh period and one hold period are 0.5/60=8.33 ms, respectively, and one set period is 16.66 ms.

When the display device is driven at the refresh rate of 1 Hz, one second may be driven with one refresh period and with 119 hold periods after the one refresh period. Also, when display device is driven at the refresh rate of 1 Hz, one frame may be driven with a plurality of refresh periods and a plurality of hold periods. At this time, one refresh period and one hold period are 1/120=8.33 ms, respectively, and one set period is 1 s.

In the refresh period, a new data voltage Vdata is charged to apply a new data voltage Vdata to the driving transistor DT, but in the hold period, the data voltage Vdata of the previous frame is held as it is to be used. In the meantime, in the hold period, a process of applying the new data voltage Vdata to the driving transistor DT is omitted so that the hold period is also referred to as a skip period.

Each of the plurality of pixels P may initialize a voltage which is charged in the pixel circuit or remains during the refresh period. Specifically, in the refresh period, each of the plurality of pixels P may remove the influence of the data voltage Vdata and the high-potential driving voltage EVDD stored in a previous frame. Accordingly, in the hold period, each of the plurality of pixels P may display an image corresponding to a new data voltage Vdata.

Each of the plurality of pixels P supplies the driving current Id corresponding to the data voltage Vdata to the electroluminescence device EL to display images, and maintains the turned-on state of the electroluminescence device EL, during the hold period.

First, the driving of the electroluminescent device and the pixel circuit of the refresh period will be described with reference to FIG. 5*a*. The refresh period may include at least one bias section Tobs1 and Tobs2, an initialization section Ti, a sampling section Ts, and a light emission section Te. However, this is only an embodiment and is not necessarily limited to this order.

Figure 5A:
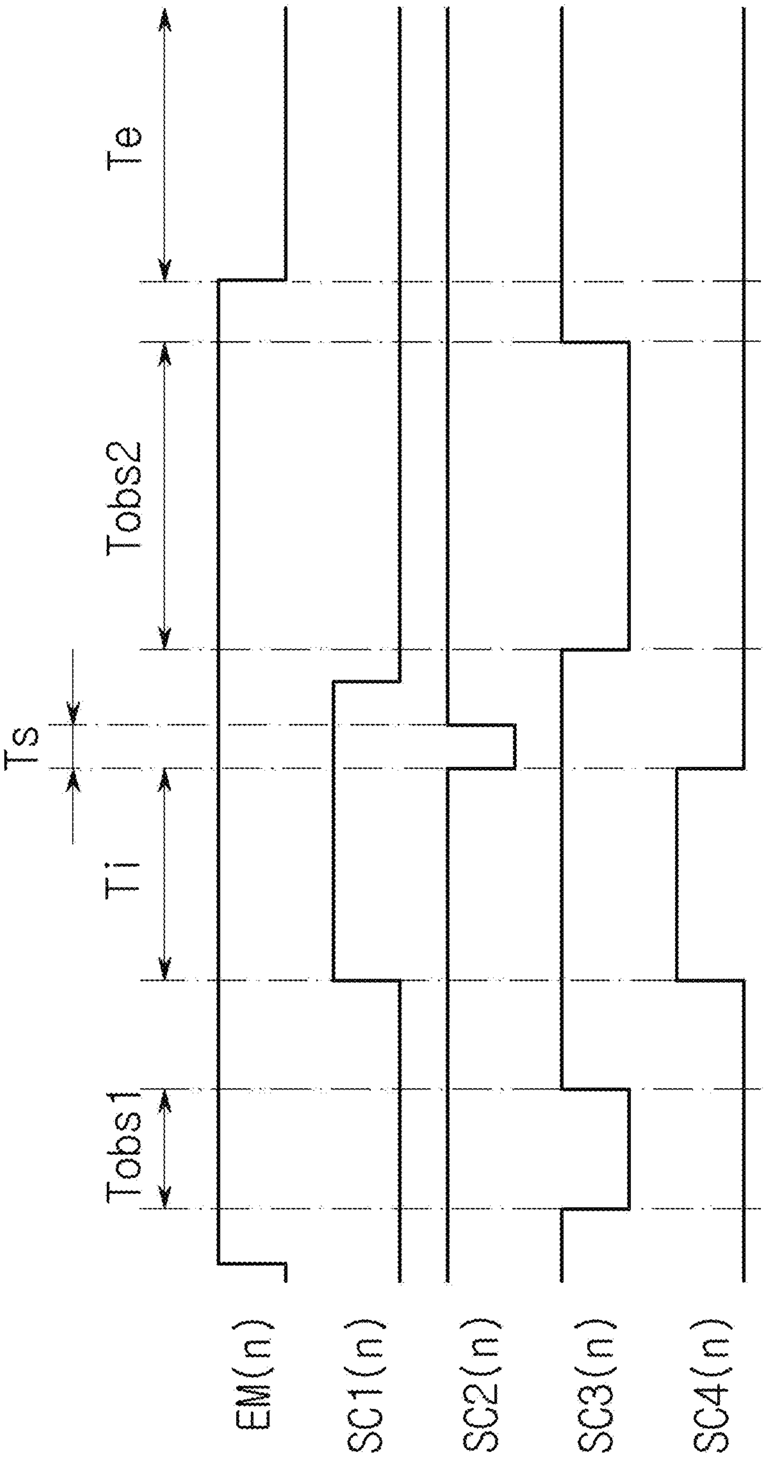
FIGS. 5*a* to 5*c* are views explaining operations of a scan signal and an emission control signal in a refresh period and a hold period in a pixel circuit illustrated in FIG. 4.

Referring to FIG. 5*a*, the pixel circuit may operate including at least one bias section Tobs1 and Tobs2 during the refresh period.

The at least one bias section Tobs1 and Tobs2 is a section in which an on-bias stress operation OBS to which the bias voltage Vobs is applied is performed. A state of the emission control signal EM is a high voltage, and the third and fourth transistors T3 and T4 are turned off. The first scan signal SC1(*n*) and the fourth scan signal SC4(*n*) are in a low voltage state and the first transistor T1 and the seventh transistor T7 are turned off. The second scan signal SC2(*n*) is in a high voltage state and the second transistor T2 is turned off.

A state of the third scan signal SC3(*n*) is a low voltage, and the fifth and sixth transistors T5 and T6 are turned on. As the fifth transistor T5 is turned on, the bias voltage Vobs is applied to the first electrode of the driving transistor DT connected to the second node N2.

Here, the bias voltage Vobs is supplied to the third node N3, that is the drain electrode of the driving transistor DT, so that the charging time or charging delay of the voltage of the fifth node N5 that is the anode electrode of the electroluminescent device EL can be reduced in the light emission period. The driving transistor DT maintains a stronger saturation.

For example, as the bias voltage Vobs increases, the voltage of the third node N3 that is the drain electrode of the driving transistor DT may increase and a gate-source voltage or a drain-source voltage of the driving transistor DT may decrease. Therefore, it is preferable that the bias voltage Vobs is at least higher than the data voltage Vdata.

Here, the magnitude of the drain-source current Id passing through the driving transistor DT may be reduced, and the stress of the driving transistor DT is reduced in a positive bias stress situation, thereby eliminating the charging delay of the voltage of the third node N3. In other words, the on-bias stress OBS may be operated before the threshold voltage Vth of the driving transistor DT is sampled, so that hysteresis of the driving transistor DT can be reduced.

Accordingly, in the at least one bias section Tobs1 and Tobs2, the on-bias stress OBS can be defined as an operation to apply directly a suitable bias voltage to the driving transistor DT during non-light emission periods.

Also, as the sixth transistor T6 is turned on in the at least one bias section Tobs1 and Tobs2, the anode electrode (or, the pixel electrode) of the electroluminescent device EL connected to the fifth node N5 is initialized to the first initialization voltage Var.

However, the gate electrodes of the fifth and sixth transistors T5 and T6 may be configured to receive separate scan signals and to be controlled independently, respectively.

That is, it is not necessarily required to simultaneously apply the bias voltage to the first electrode of the driving transistor DT and the anode electrode of the electroluminescent device EL in the bias section.

Referring to FIG. 5*a*, the pixel circuit may operate including the initialization section Ti during the refresh period. In the initialization section Ti, the voltage of the gate electrode of the driving transistor DT is initialized.

The first scan signal SC1(*n*) to the fourth scan signal SC4(*n*) and the emission control signal EM(n) are in a high voltage state, and the first transistor T1 and the seventh transistor T7 are turned on. The second transistor T2 to the sixth transistor T6 T2, T3, T4, T5 and T6 are turned off. As the first transistor T1 and the seventh transistor T7 are turned on, the second electrode and the gate electrode of the driving transistor DT connected to the first node N1 is initialized to the second initialization voltage Vini.

Referring to FIG. 5*a*, the pixel circuit may operate including the sampling section Ts during the refresh period. In the sampling section, the threshold voltage Vth of the driving transistor DT is sampled.

The first scan signal SC1(*n*), the third scan signal SC3(*n*) and the emission control signal EM(n) are in a high voltage state, and low voltages are input to the second scan signal SC2(*n*) and the fourth scan signal SC4(*n*). Accordingly, the third transistor T3 to the seventh transistor T7 (T3, T4, T5, T6, T7) are turned off, the first transistor T1 remains turned on, and the second transistor T2 is turned on. That is, the second transistor T2 is turned on, the data voltage Vdata is applied to the first transistor T1, and the first transistor T1 is diode-connected between the first node N1 and the third node N3, thereby sampling a threshold voltage Vth of the driving transistor DT.

Referring to FIG. 5*a*, the pixel circuit may operate including the light emission section Te during the refresh period. In the light emission section Te, the sampled threshold voltage Vth is canceled and the electroluminescent device EL is caused to emit light with a driving current corresponding to the sampled data voltage.

A state of the emission control signal EM is a low voltage, and the third and fourth transistors T3 and T4 are turned on.

As the third transistor T3 is turned on, the high-potential driving voltage EVDD is applied to the first electrode of the driving transistor DT connected to the second node N2 through the third transistor T3. The driving current Id supplied by the driving transistor DT to the electroluminescent device EL via the fourth transistor T4 becomes irrelevant to the value of the threshold voltage Vth of the driving transistor DT, so that the threshold voltage Vth of the driving transistor DT is compensated.

Next, the driving of the electroluminescent device and the pixel circuit of the hold period will be described with reference to FIG. 5*b*.

The hold period may include at least one bias section Tobs3 and Tobs4 and a light emission section Te'. A description of the operation of the pixel circuit identical to that of the refresh period will be omitted.

As described above, the refresh period and the hold period are different in that while, in the refresh period, a new data voltage Vdata is applied to the gate electrode of the driving transistor DT, in the hold period, the data voltage Vdata of the refresh period is maintained and used. Therefore, unlike the refresh period, the hold period does not require the initialization section Ti and the sampling period Ts.

In the operation of the hold period, even one on-bias stress OBS operation may be sufficient. However, in this embodiment, for convenience of the driving circuit, the third scan signal SC3(*n*) of the hold period is driven in the same manner as the third scan signal SC3(*n*) of the refresh period, and thus, the on-bias stress OBS in the hold period may be operated twice which is the same as the refresh period.

Figure 5B:
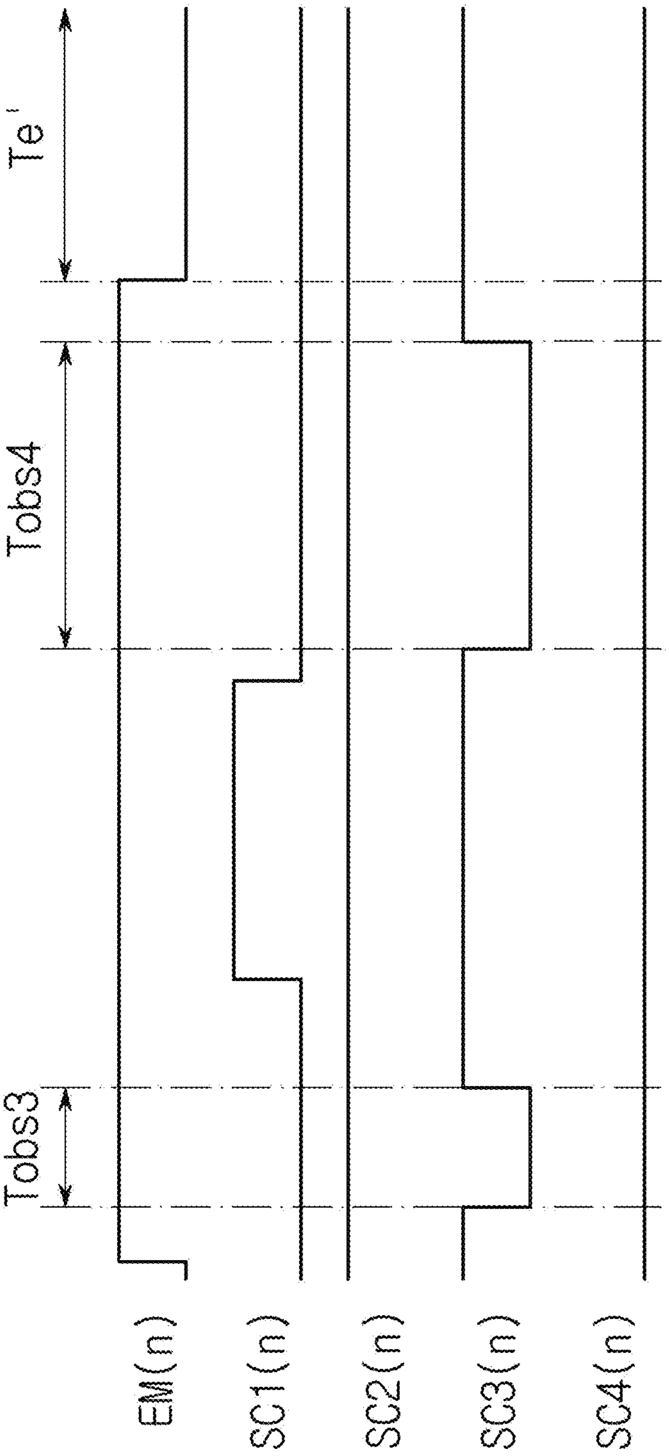

The drive signal in the refresh period described with reference to FIG. 5*a* and the drive signal in the hold period in FIG. 5*b* are different due to the second and fourth scan signals SC2(*n*) and SC4(*n*). The initialization section Ti and the sampling section Ts are not required in the hold period. Therefore, unlike the refresh period, the second scan signal SC2(*n*) is always in a high voltage state, and the fourth scan signal SC4(*n*) is always in a low voltage state. That is, the second and seventh transistors T2 and T7 are always turned off.

The driving of the electroluminescent device and the pixel circuit of the hold period, which do not perform the on-bias stress OBS operation during the hold period, will be described with reference to FIG. 5*c*.

Figure 5C:
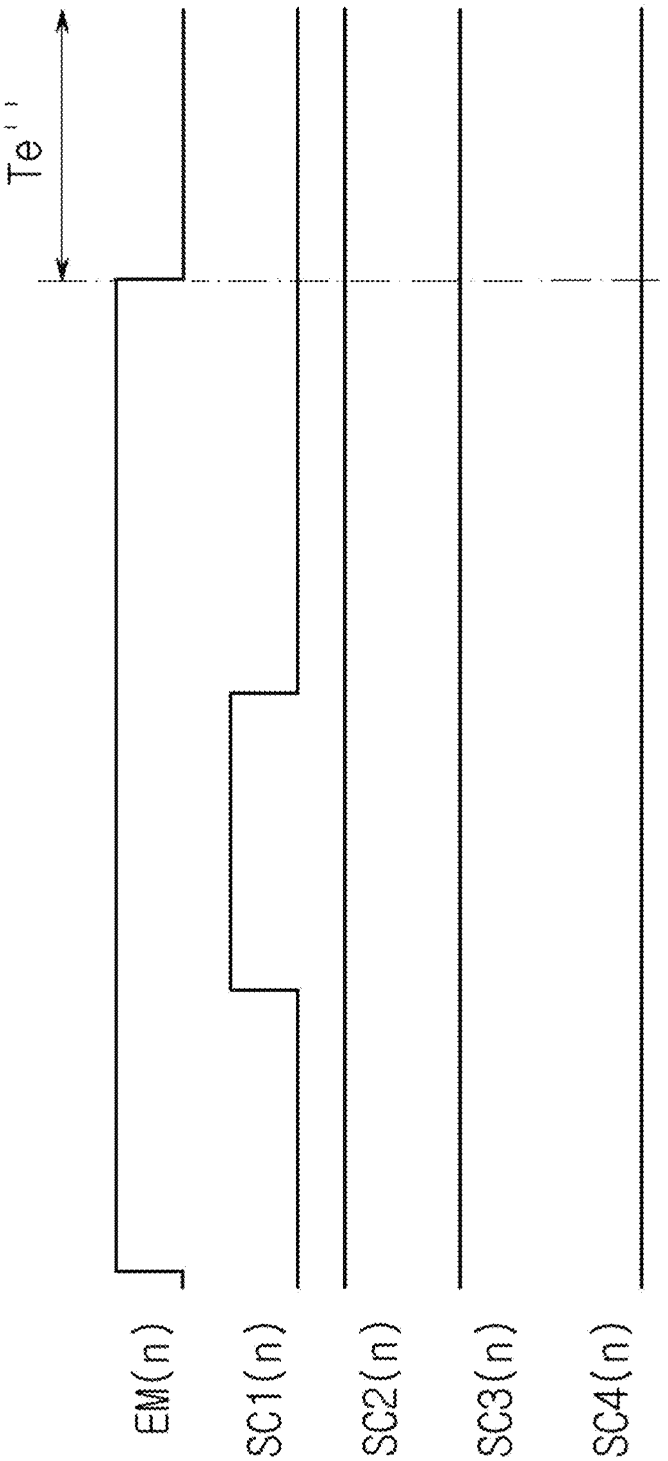

Referring to FIG. 5*c*, the pixel circuit may operate including only the light emission section Te" during the hold period. In other words, in the pixel circuit, the on-bias stress OBS operation is not performed during the hold period, the second scan signal SC2(*n*) and the third scan signal SC3(*n*) are always in a high voltage state, and the fourth scan signal SC4(*n*) is always in a low voltage state. That is, the second and fifth to seventh transistors T2, T5, T6 and T7 are always turned off.

An embodiment in which the on-bias stress OBS operation is not performed during the hold period will be described in detail with reference to FIGS. 7 to 10.

Figure 6:
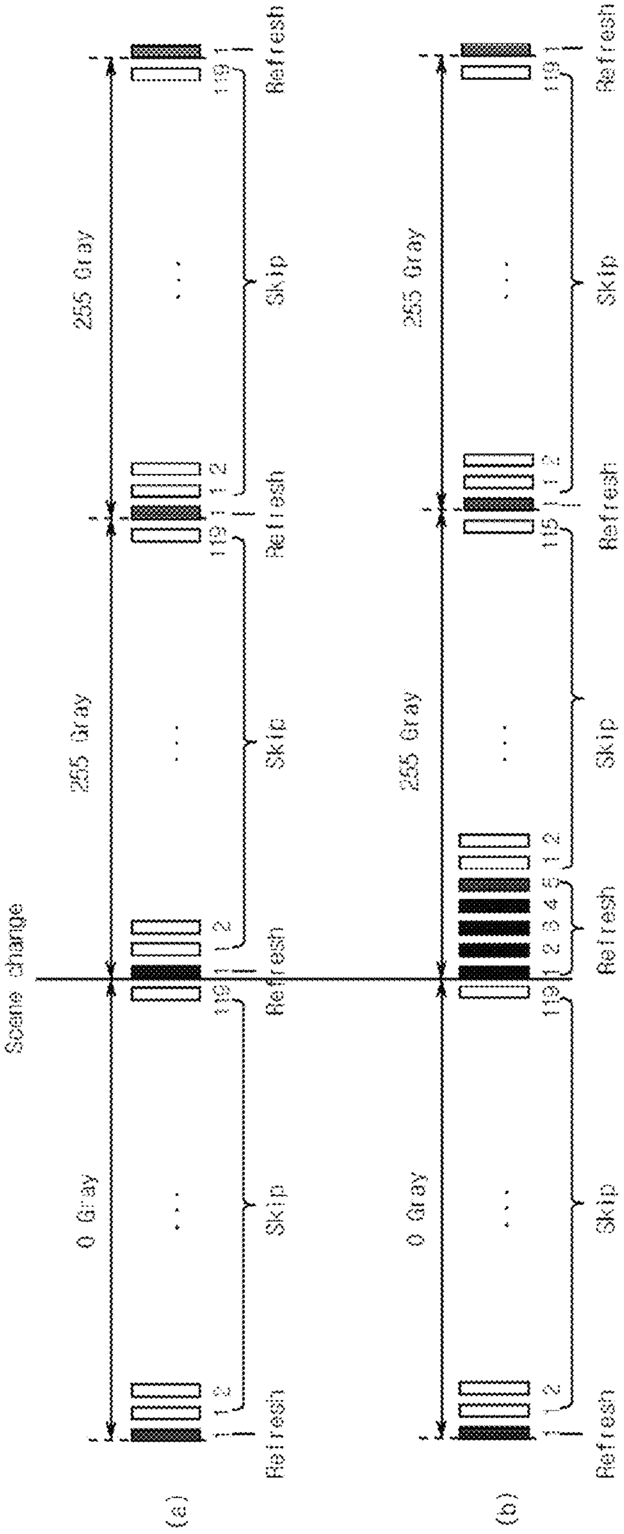
FIG. 6 is a view for explaining a multi-refresh operation during low-frequency driving in a VRR mode.

FIG. 6 is a view for explaining a multi-refresh operation during low-frequency driving in the VRR mode.

Referring to FIG. 6, by repeating refresh periods having the same image data within one frame, the time required for display luminance to reach a target level during a low-frequency driving is reduced, thereby minimizing an abnormal phenomenon such as flicker.

Since a low-frequency driving such as a 1 Hz refresh rate increases the refresh cycle of the pixel circuit, some transistors are implemented as oxide transistors with good off current characteristics to minimize leakage. Oxide transistors are effective in reducing leakage current due to their low off-current, but have a relatively slow response speed due to low electron mobility compared to polycrystalline silicon transistors.

In other words, as shown in (a) in FIG. 6, when one frame consists of 1 refresh period and 119 hold periods, when a scene change or a grayscale change occurs, there may be delays for the display luminance to reach the target level.

Accordingly, the time required for the display luminance to reach the target level can be reduced in the first frame after the grayscale change of an image since a plurality of refresh periods are included, as shown in (b) in FIG. 6. For example, the first frame after a grayscale change of the image may include 115 hold periods and 5 refresh periods having the same image data. However, the number of refresh periods and hold periods in one frame is not limited thereto. As such, having a plurality of refresh periods during a low-frequency driving may be referred to as a multi-refresh driving.

FIGS. 7 to 10 are views for explaining a method for luminance deviation compensation driving in the display device according to the embodiment of the present disclosure.

When the display device is driven at a low frequency having 1 Hz refresh rate, during the hold period, the bias voltage Vobs applied to compensate for the threshold voltage Vth of the driving transistor DT is accumulated as a stress voltage of the driving transistor DT. As the number of times the bias voltage Vobs is applied to the driving transistor DT increases, the charge of the driving transistor DT increases and becomes saturated. That is, in one frame, since the driving transistor DT is initialized as only one refresh period includes the initialization period Ti, the on-bias stress is accumulated in the remaining 119 hold periods.

Since the accumulation of the on-bias stress is due to the bias voltage Vobs in the hold period, the accumulation also occurs in multi-refresh driving having a plurality of refresh periods. Accordingly, the accumulation of the on-bias stress consequently changes the characteristics of the driving transistor DT, thereby reducing the magnitude of the driving current Id and lowering the luminance.

In addition, the threshold voltage Vth of the driving transistor DT may be temporarily changed during a scene change and then restored to a previous state. In other words, the threshold voltage Vth fluctuates in the first frame after the scene change such as a change in grayscale of the image, and as a result, the luminance of the electroluminescent device EL may be lowered. This is perceived as flicker by users at a point of time when the grayscale of the image changes.

In this way, during low-frequency driving at the refresh rate of 1 Hz, the variation of the threshold voltage Vth of the driving transistor and the bias voltage Vobs for compensating the threshold voltage Vth are accumulated, resulting in a change in the characteristics of the driving transistor DT. In order to improve luminance degradation, the on-bias stress OBS operation may not be performed during the hold period of the first frame after the change in grayscale of the image. Not performing the on-bias stress OBS operation may be configured in various embodiments as shown in FIGS. 7 to 10.

Figure 7:
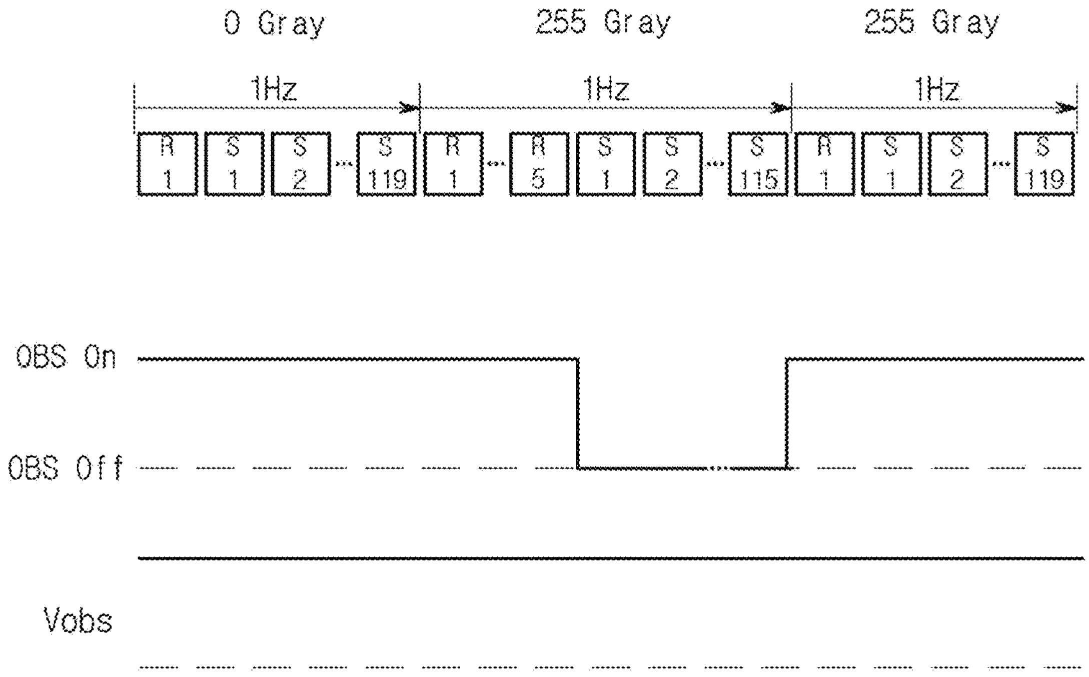
FIGS. 7 to 10 are views for explaining a method for luminance deviation compensation driving in a display device according to an embodiment of the present disclosure.

Referring to FIG. 7, the on-bias stress OBS operation may be turned off during the hold period of the first frame after a scene change.

When the third scan signal SC3(*n*) is input as a low voltage in the pixel circuit, the fifth transistor T5 is turned on, and the bias voltage Vobs is applied to the driving transistor DT. In other words, when the third scan signal SC3(*n*) is input as a high voltage, the fifth transistor T5 is turned off and the bias voltage Vobs is not applied.

Therefore, by maintaining the third scan signal SC3(*n*) at a high voltage without changing it to a low voltage during the hold period of the first frame after the change in grayscale of the image, the on-bias stress OBS operation can be turned off (OBS Off). Then, from the next frame, the on-bias stress OBS operation of the hold period may be performed again (OBS On).

That is, as shown in FIG. 7, by driving the third scan signal SC3(*n*) to turn off the on-bias stress OBS operation in the hold period, which is a stabilization period after the temporary fluctuation of the threshold voltage Vth in the first frame after the change in grayscale of the image, the accumulation of on-bias stress and the change in the threshold voltage Vth of the driving transistor DT can be reduced, thereby improving the problem of flicker.

Figure 8:
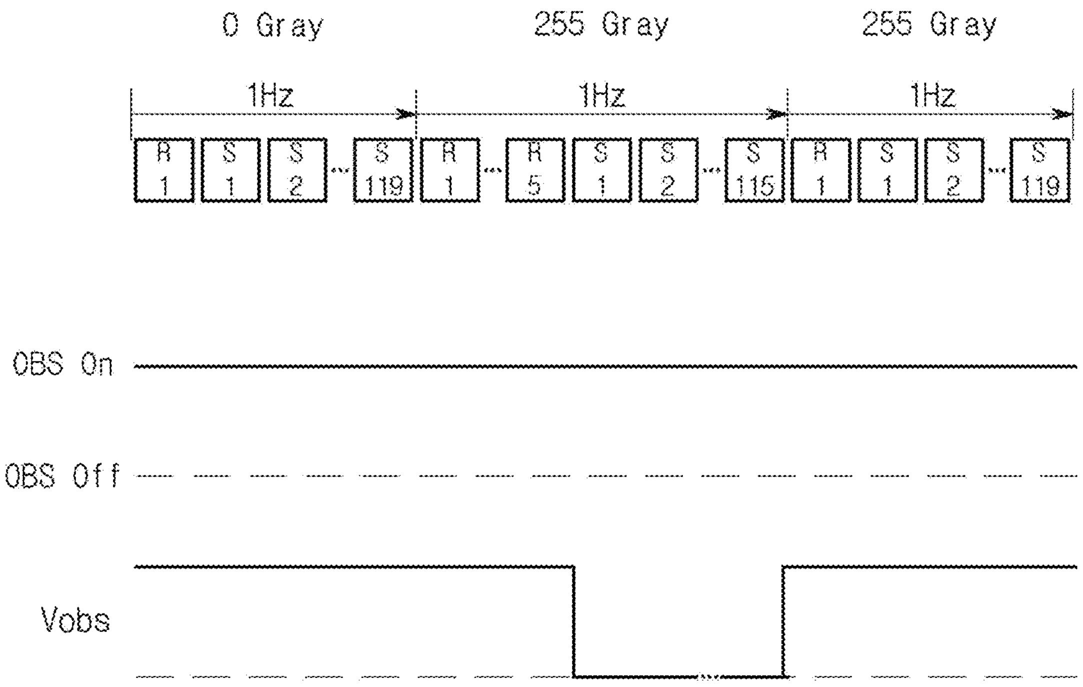

Referring to FIG. 8, the bias voltage Vobs may not be applied during the hold period of the first frame after a scene change.

In other words, even if the third scan signal SC3(*n*) is applied at a low voltage and the fifth transistor T5 is turned on, the power supply unit 500 applies a low level of the bias voltage Vobs as low as a certain level, or operates such that the bias voltage Vobs is not applied, thereby turning off the on-bias stress OBS operation. From the next frame, the on-bias stress OBS operation may be performed by restoring a level of the bias voltage Vobs of the hold period equal to a level of the bias voltage Vobs of the refresh period and then applying the same.

In this case, the bias voltage Vobs applied during the refresh period may be a first level, and the bias voltage Vobs applied during the hold period of the first frame after the change in grayscale of the image may be a second level lower than the first level.

That is, as shown in FIG. 8, by applying the bias voltage Vobs at the second level to turn off the on-bias stress OBS operation in the hold period of the first frame after the change in grayscale of the image, the on-bias stress accumulation and the change in the threshold voltage Vth of the driving transistor DT may be reduced, thereby improving flicker.

Figure 9:
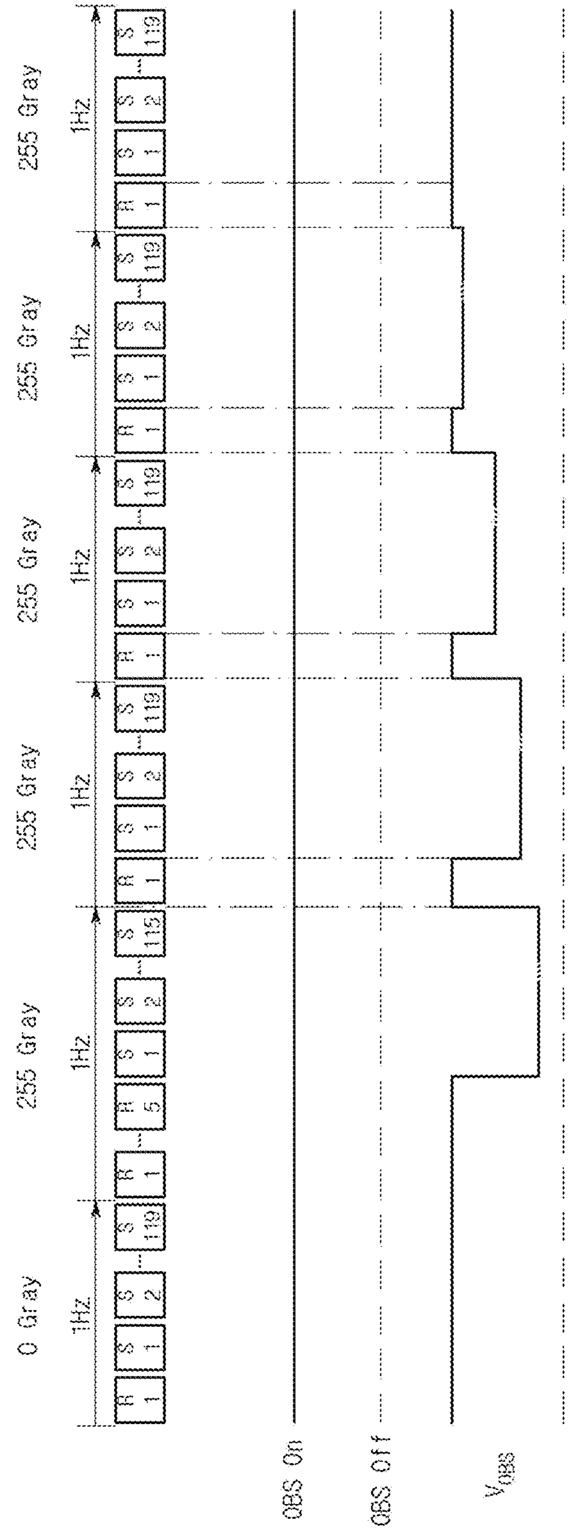

Referring to FIG. 9, it is possible to drive the display device by varying the bias voltage Vobs step by step during the hold period of the plurality of frames after a scene change.

In other words, the power supply unit 500 may operate to apply the bias voltage Vobs at a low level as low as a certain level during the hold period of the first frame after the change in grayscale of the image, and then apply the bias voltage Vobs of the hold period to increase step by step over several frames to become equal to the bias voltage Vobs of the refresh period.

In this case, the bias voltage Vobs applied during the refresh period may be the first level, and the bias voltage Vobs applied during the hold period of the first frame after the change in grayscale of the image may be a third level lower than the first level.

In addition, the plurality of frames over which the level of the bias voltage Vobs is varied may be selectively changed until a change in grayscale of the next image occurs. Also, during the refresh period of each frame, the bias voltage Vobs may be constantly maintained at the first level without being changed.

Figure 10:
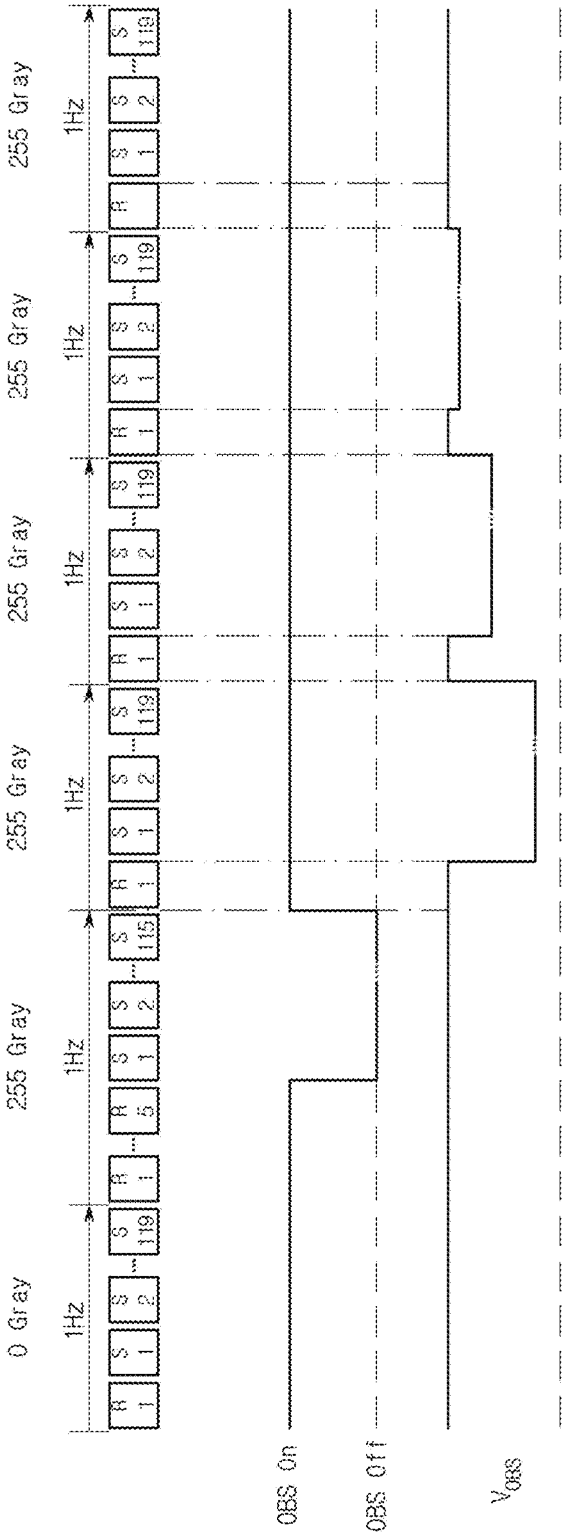

Referring to FIG. 10, the on-bias stress OBS operation is turned off during the hold period of the first frame after a scene change, and then the bias voltage Vobs may be varied step by step to be driven during the hold period of the plurality of frames.

In other words, during the hold period of the first frame after the change in grayscale of the image, it is possible to turn off the on-bias stress OBS operation by maintaining the third scan signal SC3(*n*) at a high voltage without changing it to a low voltage, apply the bias voltage Vobs of the hold period at a low voltage as low as a certain level, and vary the level over several frames so as to increase step by step to the level of the bias voltage Vobs of the refresh period.

In this case, the bias voltage Vobs applied during the refresh period may be the first level, and the bias voltage Vobs applied during the hold period of the first frame after the change in grayscale of the image may be a fourth level lower than the first level.

In addition, the plurality of frames over which the level of the bias voltage Vobs is varied may be selectively changed until a change in grayscale of the next image occurs. Also, during the refresh period of each frame, the bias voltage Vobs may be constantly maintained at the first level without being changed.

That is, as shown in FIGS. 9 and 10, by turning off the on-bias stress OBS operation during the hold period of the first frame after the change in grayscale of the image, or operating the bias voltage Vobs to vary step by step over the plurality of frames, the accumulation of the on-bias stress and the change in the threshold voltage Vth of the driving transistor DT is reduced, thereby improving a problem of flicker.

In addition, referring to FIGS. 8 and 10, when the bias voltage Vobs of the hold period is set to be lower than the bias voltage Vobs of the refresh period by about 2V, the same effect as turning off the on-bias stress OBS operation can be obtained. For example, if the bias voltage Vobs having the first level is 7V during the refresh period, the bias voltages Vobs having the second to fourth levels may be about 5V during the hold period, and the bias voltage Vobs may be operated to vary to increase step by step between 5 and 7V until a change in grayscale of the next image occurs.

Figure 11:
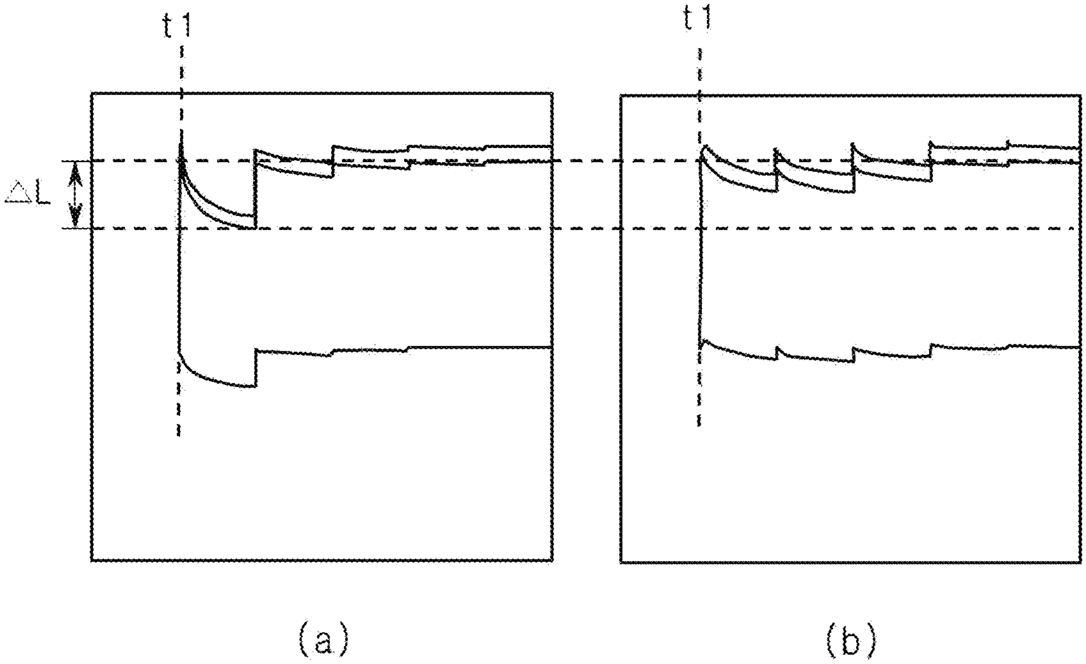
FIG. 11 are views for illustrating an effect when luminance deviation compensation driving is applied according to an embodiment of the present disclosure.

FIG. 11 are views for illustrating an effect when luminance deviation compensation driving is applied according to the embodiment of the present disclosure.

FIG. 11(*a*) shows a changing amount ΔL of the luminance at a point in time t1 when the grayscale of an image is changed in general, and (b) shows a case in which luminance deviation compensation driving according to the embodiment of the present disclosure is applied. As can be seen in FIG. 11, when the luminance deviation compensation driving is performed, flicker caused by the luminance deviation can be reduced because the changing amount ΔL of the luminance is not great even if the change in grayscale of the image occurs.

The display device according to the embodiment of the present disclosure may be described as follows.

One embodiment is a display device, including: a display panel on which a plurality of pixels are arranged to display an image; and a controller driving the pixels by dividing the pixels into a refresh period and a hold period, and the plurality of pixels may include an electroluminescent device and a pixel circuit for driving the electroluminescent device, and the pixel circuit may include a driving transistor having a first electrode configured to be applied with a data voltage and a bias voltage, and a second electrode connected to the electroluminescent device.

In the display device according to the embodiment of the present disclosure, the controller may dynamically control an on-bias stress operation of the pixel circuit based on a change in grayscale of the image during the hold period.

In the display device according to the embodiment of the present disclosure, if the grayscale of the image does not change, the controller may control the on-bias stress operation in an on state and apply a bias voltage of a first level to the pixel circuit.

In the display device according to the embodiment of the present disclosure, the controller may control the on-bias stress operation in an off state in a first hold period after the change in grayscale of the image.

In the display device according to the embodiment of the present disclosure, a first frame after the change in grayscale of the image may include a plurality of refresh periods.

In the display device according to the embodiment of the present disclosure, the controller may apply a bias voltage lower than the first level to the pixel circuit during a plurality of hold periods after the first hold period.

In the display device according to the embodiment of the present disclosure, the controller may vary the bias voltage step by step from a second level lower than the first level to the first level during the plurality of hold periods.

In the display device according to the embodiment of the present disclosure, the controller may control the bias driving in an on state in a first hold period after the change in grayscale of the image and apply a bias voltage of a third level lower than a first level to the pixel circuit.

In the display device according to the embodiment of the present disclosure, the controller may control to increase the bias voltage step by step from the second level during the plurality of hold periods after the first hold period.

In the display device according to the embodiment of the present disclosure, the pixel circuit may further include: a switching transistor connected between the driving transistor and a data line and applying the data voltage to the driving transistor in response to a first scan signal; and a bias transistor applying the bias voltage to the driving transistor in response to a second scan signal.

In the display device according to the embodiment of the present disclosure, the controller may apply a second scan signal of a turn-off level to the pixel circuit in a first hold period after the change in grayscale of the image, and apply a bias voltage of the first level to the pixel circuit.

In the display device according to the embodiment of the present disclosure, the controller may apply a second scan signal of a turn-on level to the pixel circuit in a first hold period after the change in grayscale of the image, and apply a bias voltage of a second level lower than the first level to the pixel circuit.

In the display device according to the embodiment of the present disclosure, the refresh period may include an initialization period, a sampling period, a bias period, and an emission period, and the hold period may include a bias period and an emission period.

In the display device according to the embodiment of the present disclosure, the gate driver may include first to fourth scan drivers for respectively applying first to fourth scan signals to the pixel circuit and an emission driver for applying a light emission control signal; and the second scan driver may include an odd-numbered second scan driver and an even-numbered second scan driver.

In the display device according to the embodiment of the present disclosure, the display panel may include an active area in which the plurality of pixels are disposed and a non-active area disposed around the active area, and in the non-active area, the first to fourth scan drivers may be asymmetrically disposed on both sides of the active area.

In the display device according to the embodiment of the present disclosure, a first scan driver, a second scan driver, and a third scan driver may be disposed on one side of the active area, and a second scan driver, a fourth scan driver, and an emission driver may be disposed on the other side of the active area.

In the display device according to the embodiment of the present disclosure, the emission driver may be disposed between the first to fourth scan drivers.

In the display device according to the embodiment of the present disclosure, the display device may further include a bias voltage bus line for applying the bias voltage to the pixel circuit; and an initialization voltage bus line for applying an initialization voltage to the pixel circuit, and the bias voltage bus line and the initialization voltage bus line may be disposed between the gate driver and the active area.

In the display device according to the embodiment of the present disclosure, the bias voltage and the initialization voltage may be DC voltages.

Another embodiment is a display device, including: a plurality of pixels comprising an electroluminescent device and a pixel circuit for driving the electroluminescent device to display an image; and a controller driving the pixel circuit by dividing the pixel circuit into a refresh period and a hold period, and if a grayscale of the image does not change during the hold period, the controller may apply a bias voltage of a first level to the pixel, and if a grayscale of the image changes, the controller may apply a bias voltage of a second level lower than the first level in a first hold period, after the grayscale changes.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:
a display panel on which a plurality of pixels are arranged to display an image;
a gate driver supplying scan signals and emission control signals to the display panel; and
a controller driving the plurality of pixels by dividing the plurality of pixels into a refresh period and a hold period,
wherein the plurality of pixels comprise an electroluminescent device and a pixel circuit for driving the electroluminescent device,
wherein the pixel circuit comprises a driving transistor having a first electrode configured to be applied with a data voltage and a bias voltage, and a second electrode connected to the electroluminescent device,
wherein the bias voltage is a DC voltage,
wherein the controller dynamically controls an on-bias stress operation of the pixel circuit based on a change in grayscale of the image during the hold period, and
wherein a first frame after the change in grayscale of image comprises a plurality of refresh periods that repeatedly write a same image data to each pixel of the plurality of pixels before the hold period.

2. The display device of claim 1,
wherein, if the grayscale of the image does not change, the controller controls the on-bias stress operation in an on state and applies a bias voltage of a first level to the pixel circuit.

3. The display device of claim 2,
wherein the controller controls the on-bias stress operation in an off state in a first hold period after the change in grayscale of the image.

4. The display device of claim 3,
wherein the controller applies a bias voltage lower than the first level to the pixel circuit during a plurality of hold periods after the first hold period.

5. The display device of claim 4,
wherein the controller varies the bias voltage step by step from a second level lower than the first level to the first level during the plurality of hold periods.

6. The display device of claim 2,
wherein the controller controls a bias driving to an on state in a first hold period after the change in grayscale of the image and applies a bias voltage of a third level lower than a first level to the pixel circuit.

7. The display device of claim 6,
wherein the controller controls to increase the bias voltage step by step from a second level lower than the first level during a plurality of hold periods after the first hold period.

8. The display device of claim 6,
wherein the controller applies a second scan signal of a turn-off level to the pixel circuit in a first hold period after the change in grayscale of the image, and applies a bias voltage of the first level to the pixel circuit.

9. The display device of claim 2,
wherein the pixel circuit further comprises:
a switching transistor connected between the driving transistor and a data line and applying the data voltage to the driving transistor in response to a first scan signal; and
a bias transistor applying the bias voltage to the driving transistor in response to a second scan signal.

10. The display device of claim 9,
wherein the controller applies a second scan signal of a turn-on level to the pixel circuit in a first hold period after the change in grayscale of the image, and applies a bias voltage of a second level lower than the first level to the pixel circuit.

11. The display device of claim 1,
wherein the refresh period comprises an initialization period, a sampling period, a bias period, and an emission period, and
wherein the hold period comprises a bias period and an emission period.

12. The display device of claim 1,
wherein the gate driver comprises first to fourth scan drivers for respectively applying first to fourth scan signals to the pixel circuit and an emission driver for applying a light emission control signal; and
wherein the second scan driver comprises an odd-numbered second scan driver and an even-numbered second scan driver.

13. The display device of claim 12,
wherein the display panel comprises an active area in which the plurality of pixels are disposed and a non-active area disposed around the active area, and
wherein, in the non-active area, the first to fourth scan drivers are asymmetrically disposed on both sides of the active area.

14. The display device of claim 13,
wherein a first scan driver, a second scan driver, and a third scan driver are disposed on one side of the active area, and
a second scan driver, a fourth scan driver, and an emission driver are disposed on the other side of the active area.

15. The display device of claim 12,
wherein the emission driver is disposed between the first to fourth scan drivers.

16. The display device of claim 13, further comprising:
a bias voltage bus line for applying the bias voltage to the pixel circuit; and
an initialization voltage bus line for applying an initialization voltage to the pixel circuit,
wherein the bias voltage bus line and the initialization voltage bus line are disposed between the gate driver and the active area.

17. The display device of claim 16,
wherein the initialization voltage is a DC voltage.

18. A display device, comprising:
a plurality of pixels comprising an electroluminescent device and a pixel circuit for driving the electroluminescent device to display an image; and
a controller driving the pixel circuit by dividing the pixel circuit into a refresh period and a hold period,
wherein, if a grayscale of the image does not change during the hold period, the controller applies a bias voltage of a first level to the pixel circuit, and if a grayscale of the image changes, the controller applies a bias voltage of a second level lower than the first level in a first hold period, after the grayscale changes,
wherein the bias voltage is a DC voltage, and wherein a first frame after the change in grayscale of image comprises a plurality of refresh periods that repeatedly write a same image data to each pixel of the plurality of pixels before the hold period.

* * * * *